United States Patent
Kazem

(10) Patent No.: US 6,958,922 B2
(45) Date of Patent: Oct. 25, 2005

(54) HIGH OUTPUT POWER QUASI-SQUARE WAVE INVERTER CIRCUIT

(75) Inventor: Kamran Kazem, Irvine, CA (US)

(73) Assignee: Magnetic Design Labs Inc., Santa Ana, CA (US)

( * ) Notice: Subject to any disclaimer, the term of this patent is extended or adjusted under 35 U.S.C. 154(b) by 76 days.

(21) Appl. No.: 10/625,070

(22) Filed: Jul. 22, 2003

(65) Prior Publication Data

US 2004/0257834 A1 Dec. 23, 2004

Related U.S. Application Data

(63) Continuation-in-part of application No. 10/624,376, filed on Jul. 21, 2003.
(60) Provisional application No. 60/397,880, filed on Jul. 22, 2002, and provisional application No. 60/397,881, filed on Jul. 22, 2002.

(51) Int. Cl.[7] ............................................. H02M 3/335
(52) U.S. Cl. ......................................... 363/26; 363/97
(58) Field of Search .............................. 363/24, 25, 26, 363/95, 97, 133, 134

(56) References Cited

U.S. PATENT DOCUMENTS 5,268,832 A * 12/1993 Kandatsu ..................... 363/95
6,021,052 A * 2/2000 Unger et al. .................. 363/26
6,094,363 A * 7/2000 Cheng ......................... 363/26
6,169,670 B1 * 1/2001 Okubo et al. ................. 363/41
6,259,615 B1 * 7/2001 Lin ............................... 363/98

* cited by examiner

Primary Examiner—Adolf Berhane
(74) Attorney, Agent, or Firm—James F. Kirk

(57) ABSTRACT

A high power inverter using toroidal transformer with a first end and a second end. A first and second switch for switching the first end and the second end of the transformer primary alternately to ground during alternate half cycles for first and second on-time intervals. a pulse-width modulator and driver circuit for driving the first and second switch into conduction and for modulating the first and second on time intervals. A non-conductive interval is interposed between switch on-times. A control circuit for sensing the output voltage to maintain the output voltage within a predetermined range. An acoustic reference for a clock circuit, the clock circuit controlling the start of each power cycle. A current sense circuit for signaling overload when the on-voltage across the switching means exceeds a predetermined threshold. A switch for connecting the first and second ends of the transformer primary together between on-times.

19 Claims, 17 Drawing Sheets

HIGH OUTPUT POWER QUASI-SQUARE WAVE INVERTER CIRCUIT

This application is a Continuation-In-Part Application and formalization of Provisional Application Ser. No. 60/397,880 filed Jul. 22, 2002 and having a common inventor, Kamran Kazem and also U.S. application Ser. No. 10/624,376 filed Jul. 21, 2003 claiming priority from Provisional Application Ser. No. 60/397,881 filed Jul. 22, 2002 and having a common sole inventor, Kamran Kazem.

BACKGROUND OF THE INVENTION

Field of the Invention

The present invention relates to the field of power supplies and more particularly to the field of high output power inverter circuits for converting a dc voltage to an ac voltage. The circuit taught herein is now used in high output power low frequency inverter such as those used for military applications operating from a nominal 24 Vdc voltage source derived from a series stack of two +12 Vdc automotive deep discharge batteries to service motor or lamp loads of up to 2500 watts.

SUMMARY OF THE INVENTION

It is first objective of this invention to provide a high output power inverter circuit coupled to obtain power from a voltage source (Vb) such as a battery service or stack of automotive 12 Vdc batteries that provide a nominal voltage of 24 Vdc. The voltage source has a ground return line (Vr). The high output power inverter reduces transient noise and losses by the use of a toroidal transformer that has a primary and a secondary winding. The primary winding has a first end and a second end and a center tap. The center tap is coupled to the voltage source.

It is a second objective of this invention to use a first and second switch to conductively couple the first end and the second end of the transformer primary winding alternately to the ground return line (Vr) during alternate half cycles of successive power cycles for respective and successive first and second on-time intervals. The toroidal transformer secondary provides a quasi-square wave output voltage in response to the conductive coupling of the first and the second ends of the transformer primary to Vr.

It is a third objective of this invention to provide a substantially constant output voltage from the transformer secondary by using a pulse-width modulator and driver circuit for driving the first and second switch into conduction for each on-times during alternate half cycles of successive power cycles. The pulse-width modulator interposes a dead-time or non-conductive interval between the first and second on-time intervals and during the interval preceding the start of any subsequent first on time interval. The driver selected has sufficient output drive current to enable the high output power inverter circuit to operate as a master unit and to drive additional slave high output power inverter circuits so that their respective isolated secondary windings can be coupled together in series or in parallel to provide a higher output voltage or to provide a greater load capability.

It is a fourth objective of the high output power inverter circuit to provide a shunt-switching circuit having a first and second FET shunt switch responsive to a shunt drive signal to connect the first end of the primary winding to the second end of the primary winding during the dead-time or off-time of the first and second switches.

The connection is controlled by a dead-time detection and shunt drive circuit that has a first comparator that is connected to compare the amplitude of the voltage at the first and second ends of the non-conducting primary windng with a predetermined portion of the voltage source (Vb) and to output a dead-time signal in response to the non-conducting primary winding voltage exceeding the predetermined portion of the voltage source (Vb. The dead-time signal is then coupled to the shunt driver circuit to command the shunt switches into the conductive state.

It is a fifth objective of the high outputpower inverter circuit to use an output current monitor circuit to measure the output load current and to interrupt the drive signal to the shunt switching circuit when the measured output load current is below a predetermined limit to conserve operational power dissipation by interrupting shunt drive signal power during periods of very low output power demand.

It is a sixth objective of the high output power inverter circuit to provide a low battery voltage, time delay and interrupt circuit that compares the voltage sourcevoltage or battery voltage (Vb) measured respect to the ground return line (Vr) with a predetermined low voltage source reference voltage and to output a low voltage source signal in response to the voltage source voltage falling below a predetermined low voltage source voltage limit. The low voltage signal is coupled to an over-current delay and latch circuit to set the over current latch to be true after a predetermined time delay.

It is a seventh objective of the high output power inverter circuit to provide a high battery voltage and interrupt circuit that compares the voltage source voltage (Vb) when measured with respect to the ground return line (Vr) with a predetermined high voltage source reference voltage and to output a high voltage source interrupt signal in response to the voltage source Vb rising above the predetermined high voltage source voltage limit. The high voltage source signal is coupled to the over-current delay and latch circuit to set the over current latch to be true with no predetermined time delay.

DESCRIPTION OF THE PREFERRED EMBODIMENT

Figure 1:
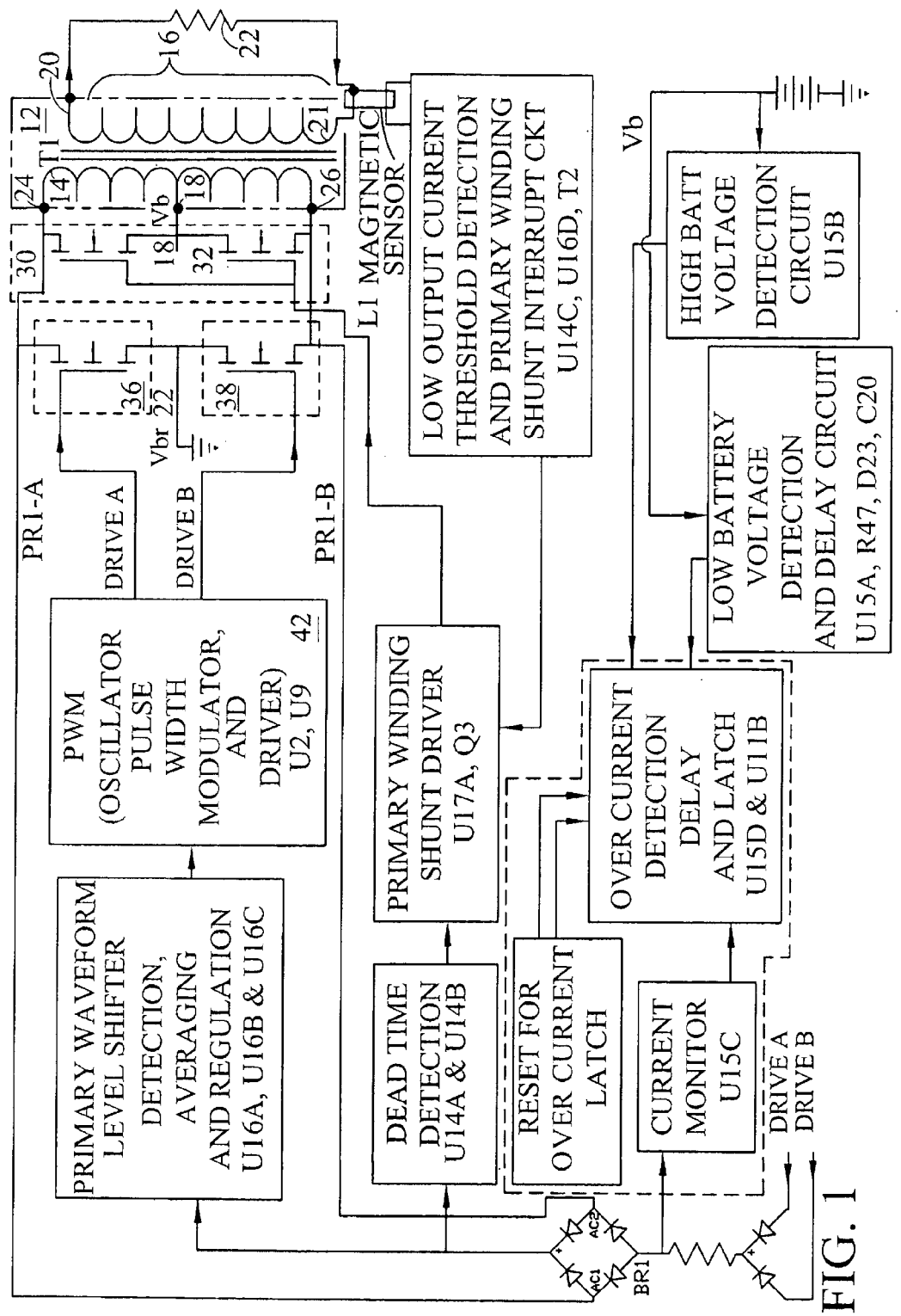
FIG. 1 is a block diagram of the High Output Power Quasi-Square Wave Inverter Circuit.

Referring now to the drawings, FIG. 1 is a schematic block diagram of the invention High Output Power Quasi-Square Wave Inverter Circuit 10. The T1 transformer 12 has a primary winding 14 and a secondary winding 16. The transformer 12 is typically wound on a toroidal core (not shown). As background, the invention circuit is designed to operate from a voltage source (Vb) (not shown) applied to the transformer 12 primary winding center tap 18 such as a battery service or battery stack of 12 Vdc automotive type batteries supplying a nominal 24 Vdc. The voltage source has a ground return (Vr) represented by a ground symbol 20. The circuit 10 provides a nominal output voltage of 115 Vac to a load 22 from the ground isolated secondary winding 16 of transformer 12 at a nominal frequency of 60 Hz. The maximum design output power fort the circuit disclosed herein is 2500 watts. However, short time loads such as cold filament loads encountered with lamp loads and locked rotor loads encountered with motor loads are accommodated for transients lasting lip to several seconds at power levels of up to 10,000 watts. The circuit is packaged in a Ruggedized Inverter Structure that is the subject of a co-pending non-provisional application Ser. No. 10/624,376 filed Jul. 21, 2003 claiming priority from 60/397,881 filed Jul. 22, 2001 the contents of which are incorporated herein by reference in their entirety.

The invention circuit is for a "High Power" application of the order of 2500 watts so the construction of the transformer is critical to the application. The T1 transformer core is a toroid formed from silicon steel. The construction of a typical transformer with an output capacity of 2500 watts would use an E-I core. However, the transformer is designed to use a toroidal transformer core to provide better coupling from the primary winding 14 to the secondary winding 16 and to reduce leakage inductance and therefore, reduce transient losses. The window in the core is near full. However, a region is reserved for a mounting bolt (not shown). The toroidal transformer 12 has a base surface, a top surface and a window containing a pre-cast central hole (not shown). A space between the transformer base surface and a ¼ inch thick flat aluminum plate (not shown) under the toroidal transformer is filled with a thermally conductive resin (not shown). The resin is an epoxy filled with aluminum powder to enhance its thermal conductivity. The window of the core, except for a pre-cast central hole is filled with wire turns and loaded epoxy except for a pre-cast hole that is reserved for the mounting bolt. The wire that is used for the secondary is square in cross section and is number 10 wire. The temperature specified for the wire insulation is 200 degrees centigrade. The construction is therefore class H for the transformer. Winding resistance, turns ratio, operating voltage and other requirement related to design choice are specified in a source control document that is used to purchase the transformer. The transformer, T1, is secured to the plate by a hold down bolt that passes through the pre-cast hole through the window in the loaded epoxy fill from the top surface of the toroid to the bottom surface.

A fiberglass plate (not shown), is positioned on the top surface of transformer 12. Three terminals on the plate are coupled to the first end 24, the second end 26 and the center tap 18 of the primary winding. Two terminals on the fiberglass plate are coupled to the first and second ends 20, 21 of the secondary winding and to the load resistor. The secondary does not have a center-tap. The secondary voltage nominally a 120 Vac quasi-square wave or quasi-sine wave 60 Hz wave form such as that shown as waveform PRI-A or PRI-B in FIG. 2. The dead-time is is about three milliseconds in a 60 Hz output and is indicated as intervals 23a and 23b. During the dead time, or off-time, shunt switches shown 30, 32 on FIG. 1 and more particularly on FIG. 6 connect the first and second ends 24, 26 of the primary winding 14 together to form a temporary common node. The shunt switches do not connect the common node to ground.

Figure 2:
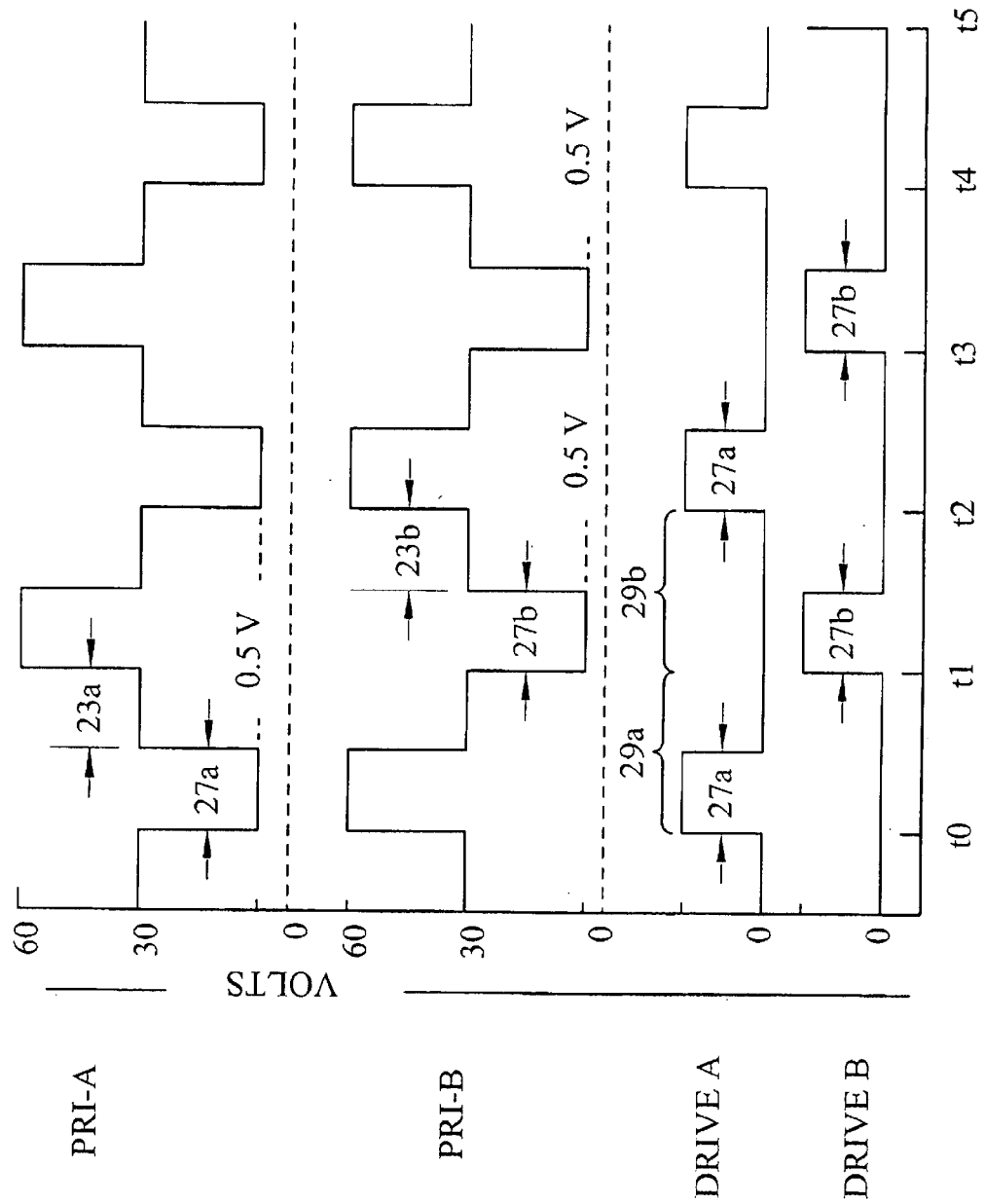
FIG. 2 is a schematic timing diagram for several voltage waveforms.

FIG. 2 shows voltage waveforms that depict a power cycle that starts at time t0 as first FET switches drive the voltage at PRI-A to a voltage level near 0.5 V during interval "27a" in response to the DRIVE A signal going high and the PRI-B signal to 0.5 V during interval 27b in response to the DRIVE B signal going high. A complete power cycle extends from time t0 to t2. A power cycle includes a first half cycle characterized by bracket 29a and a second half cycle characterized by bracket 29b. The first FET switches 36 shown on FIG. 5, remain on and conducting until the DRIVE A applied to the gates of the first switches goes low after which the first and second FET switches are off . . The interval during which the first and second FET switches are off is called the dead-time mentioned above as intervals 23a and 23b. At time t1, the DRIVE B signal goes high and turns on the second FET switches 38. The second FET switches remain on until the DRIVE B switches turn off in response to the DRIVE B signal going low. The interval from the DRIVE B signal going low until t2 is a second dead-time interval 23b. The first on-time is the on-time of the first switch and it is identified by the interval 27a. The second on-time is the on-time of the second switch and it is identified by the interval 27b. Waveforms characterizing a second power cycle are shown in which the on-time of the first switch is identified by the C(2) dimension mark and the second switch is identified by the D(2) dimension mark.

Figure 6:
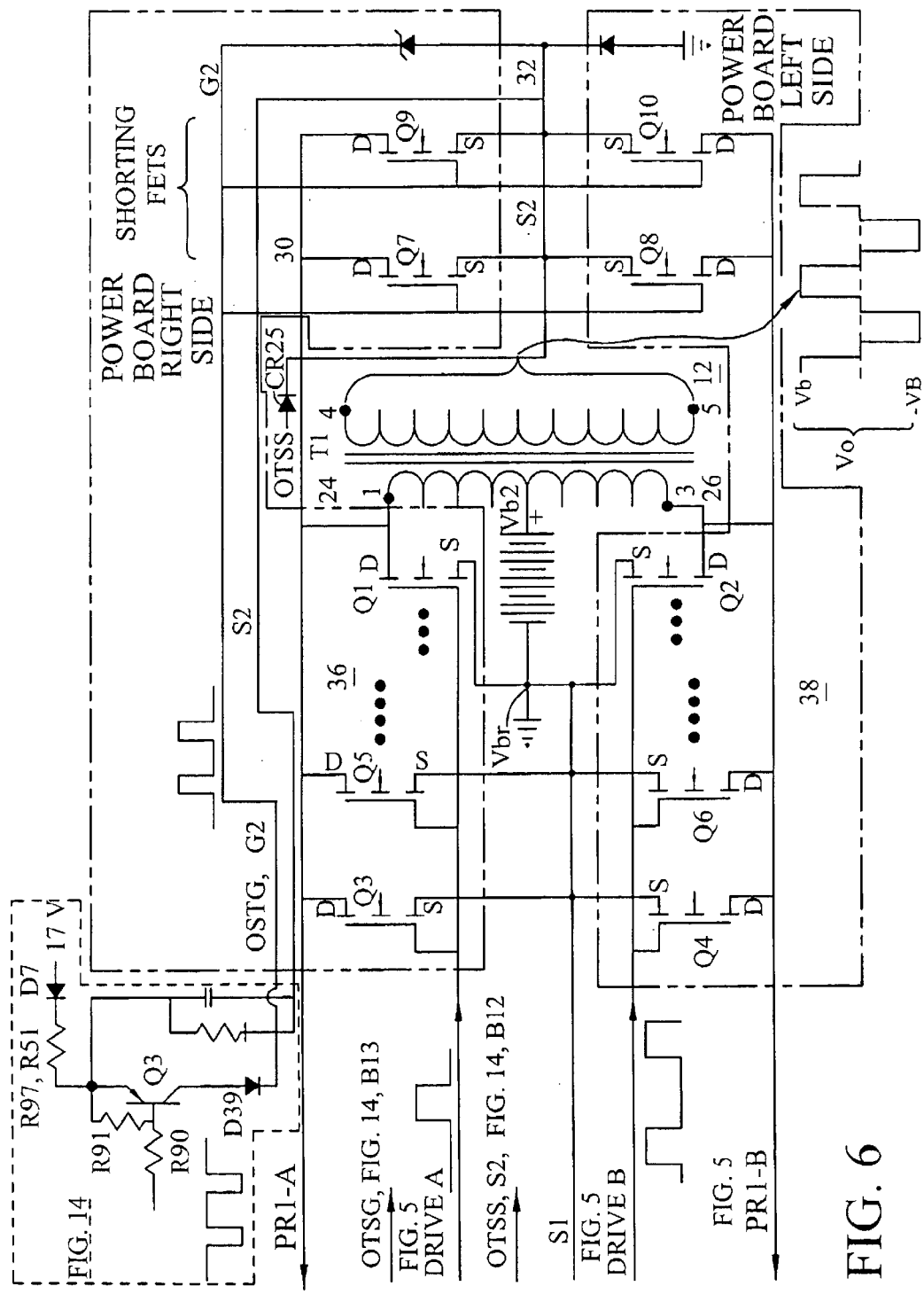
FIG. 6 is a schematic of the output inverter and the shunt switches driving output transformer T1.

During the dead time, or off-time, the first and second shunt switches 30, 32 shown on FIG. 1 and more particularly on FIG. 6 as Q7, Q9 30 and Q8, Q10 32connect the first and second ends of the primary winding together to form a temporary common node. The shunt switches do not connect the common node to ground 20.

Referring now to FIG. 6, heat is removed from the core of the transformer 12 and the copper wire thereon (not shown) in the window of the transformer via the thermally conductive potting material and then through an aluminum plate mechanically coupled to the power supply frame. Phantom blocks 36 and 38 represent a first and second switch which are connected to the first end 24 and the second end 26 of the T1 transformer primary 14 to alternately conductively couple the respective transformer ends 24, 26 to the voltage source. battery return or ground return line (Vr) during alternate half cycles of succesive power cycles for respective and succesive first and second on-time intervals. The waveforms PRI-A and PRI-B on FIG. 2 schematically represent the voltage on each end of the primary winding. The voltage between the ends of the secondary has the same shape as the PRI-A and PRI-B wave forms but is isolated from Vr and is referred to as quasi-square wave or quasi-sine wave output voltage. on FIG. 6

The first and second switch 36, 38 (also referred to as LEFT and RIGHT switches) shown on FIGS. 1, 5, 6, 12, and 15 are each a combination of 16 FET switches in parallel on a first and second power module (not shown). Phantom block 30 on FIG. 6 represents a first shunt switch. The first shunt 30 switch is formed on the first power module by four FET switches and a second shunt switch represented by phantom block 32 is formed on the second (RIGHT) power module by four FET switches. The first (LEFT) and second (RIGHT) power modules each have an aluminum base with a thickness of ¼ inches. The first power module is coupled to the left inner wall of the power supply frame and the second power module is coupled to the right inner wall of the power supply frame. The first and second, power modules each have a power FET circuit board having an inner surface and an outer surface with two rows of FETs, each row having 10 FETs for a total of 40 FETs. Each power FET circuit board has an inner surface and an outer surface coupled to its respective aluminum base. The FETs used on each power FET circuit board are IRF540; 100 V, 28A power MOSFETs coupled in two parallel sets. The first set on the first power. FET circuit board form the first switch is comprised of 16 of the 20 MOSFETs and the second set comprised of the remaining 4 out of 20 MOSFETs form the first shunt switch. The first set of 16 MOSFETs forming the first switch are used for the power switching, while the first remaining set of 4 MOSFETs forming the first shunt switch are used for the transformer off-time shorting. The first set on the second power FET circuit board form the second switch are comprised of 16 of the 20 MOSFETs and the second set comprised of the remaining 4 out of 20 MOSFETs for the second shunt switch. The first set of 16 MOSFETs forming the second switch are used for the power switching while the remaining set of 4 MOSFETs forming the second shunt switch are used for the transformer off-time shorting.

Off-Time Shorting Circuit

Figure 12:
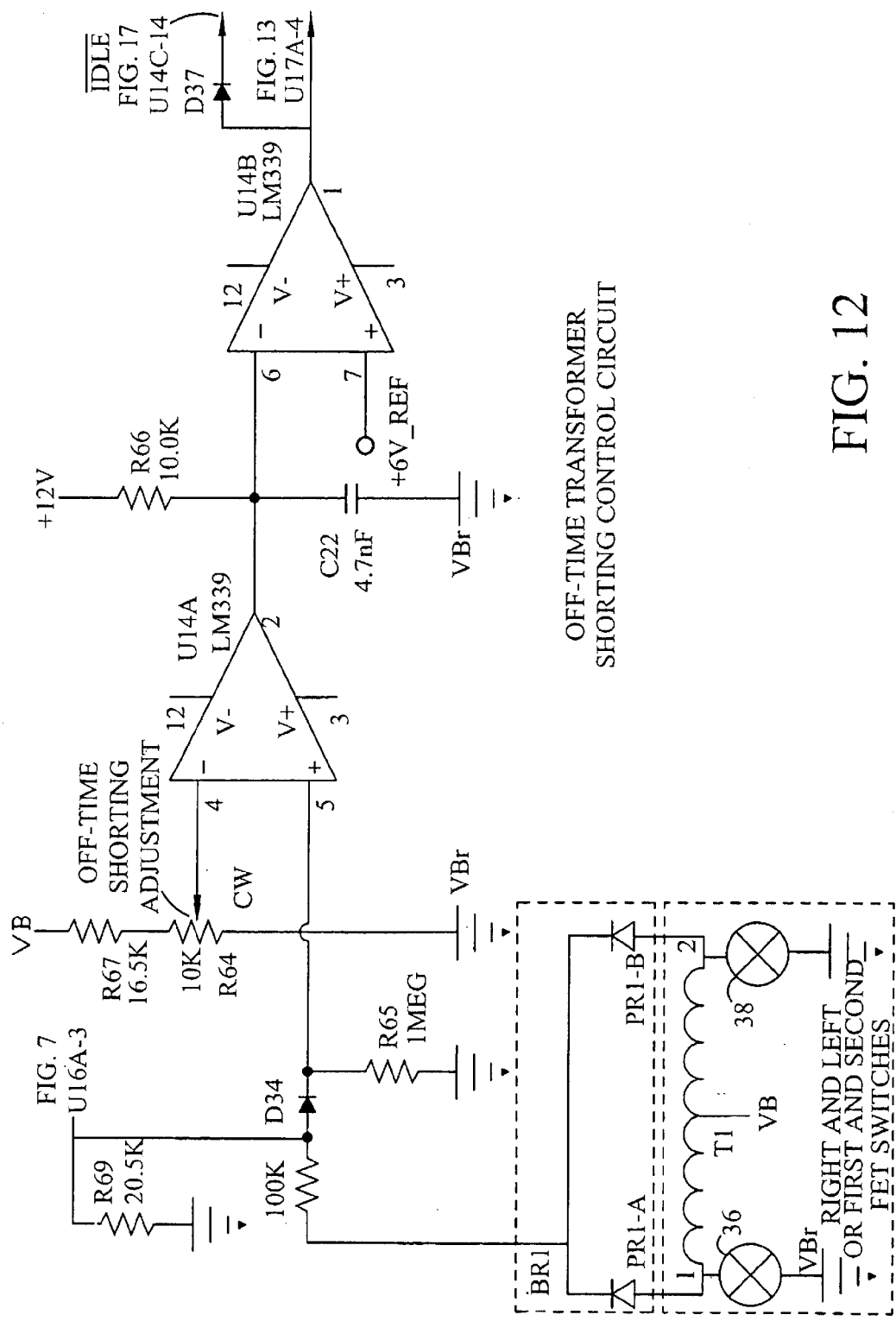
FIGS. 12, 13, and 14 are schematics of the off-time shorting circuits.

FIG. 12 shows U14A-5, the non-inverting input of an LM339 comparator receiving sample signals from PR1-A and PR1-B off of the top two diodes of rectifier BR1 via D34. If either the first or second switch, (right or left switch) is on, the voltage on the cathodes of the top two diodes of BR1 that are shown would approach twice the voltage of the Vb souce. The object of the circuit is to prevent OFF-TIME shorting of the primary windings during this timing interval which will coincide with the DRIVE and DRIBE B pulses. As the voltage on U14-5 exceeds the voltage on U14A—4, the inverting input, the output at U14A-5 goes high. A high on the output of U—-2 provides a low out of the output of U14B-1 which is supplied to U17A-4 , an inverting input of an LM339 comparator on FIG. 13, A low on the inveting input of LM17A results in a high on its output which blocks the turn-on of the Q3 PNP to dicussed, thereby blocking the turn on of the shorting-transistoros, 30, 32 during any first or second on-time.

With the first and second switches 36, 38 both off at least of at the end of a DRIVE or DRIVE B on-time, a first or second on-time, the signal out of the BR1 bridge is low. The low is coupled through D34 to U14to U–A-5 and the low is compared to the voltage tapped from R64. The R64 pot is adjusted to permit the state of the comparator to reverse as soon as the first or second on time terminates marking the beginning of a dead-time.

With a relative low on pin 5, the output of U14 A goes low and the output of U14B goes high. A high out of U14B to U17A-4 on FIG. 13 can produce a low on the gate of Q3 resulting in the turn-on of the shorting FETs 30, 32 while the dead time condition remains.

Off time shorting is generated from the absence of DRIVE A and DRIVE B signals from U2-16 and U2-13. The DRIVE A and DRIVE B signals are coupled to the anodes of D26 and D42 respectively. The cathodes of these two diodes are common. The common cathode node is coupled to the non-inverting input of comparator U17C-9. The output of U17C is coupled to the non-inverting input of U17A-5. The output of U17A is coupled to the base drive for Q3 as shown on FIG. 14. A low appears on the output of U17C and U17A in the absence of a DRIVE A and DRIVE B signal which is the off-time. On application of a low to the base drive for Q3, Q3 is driven into saturaition and all eight shunt switches are driven into conduction, shorting the first end of the transformer primary PRI-1 to the second end of the transformer primary PRI-2.

The Q3 transistor is a 2N2907A PNP high speed, one amp, small-signal transistor switch. The output of Q3 is coupled through diode D39 and feeds the gates of the off-time shorting transistors on both the left and right power boards. The shunt transistors short the first and second ends of the primary windings together, but not to ground. The short or shunt created by the eight shunt transistors allows the primary magnetizing and leakage inductance current to re-circulate and degenerate and to reset the core. The short created by the shunt transistors also helps keep the output waveform clean during the FET switch off-time.

Figure 14:
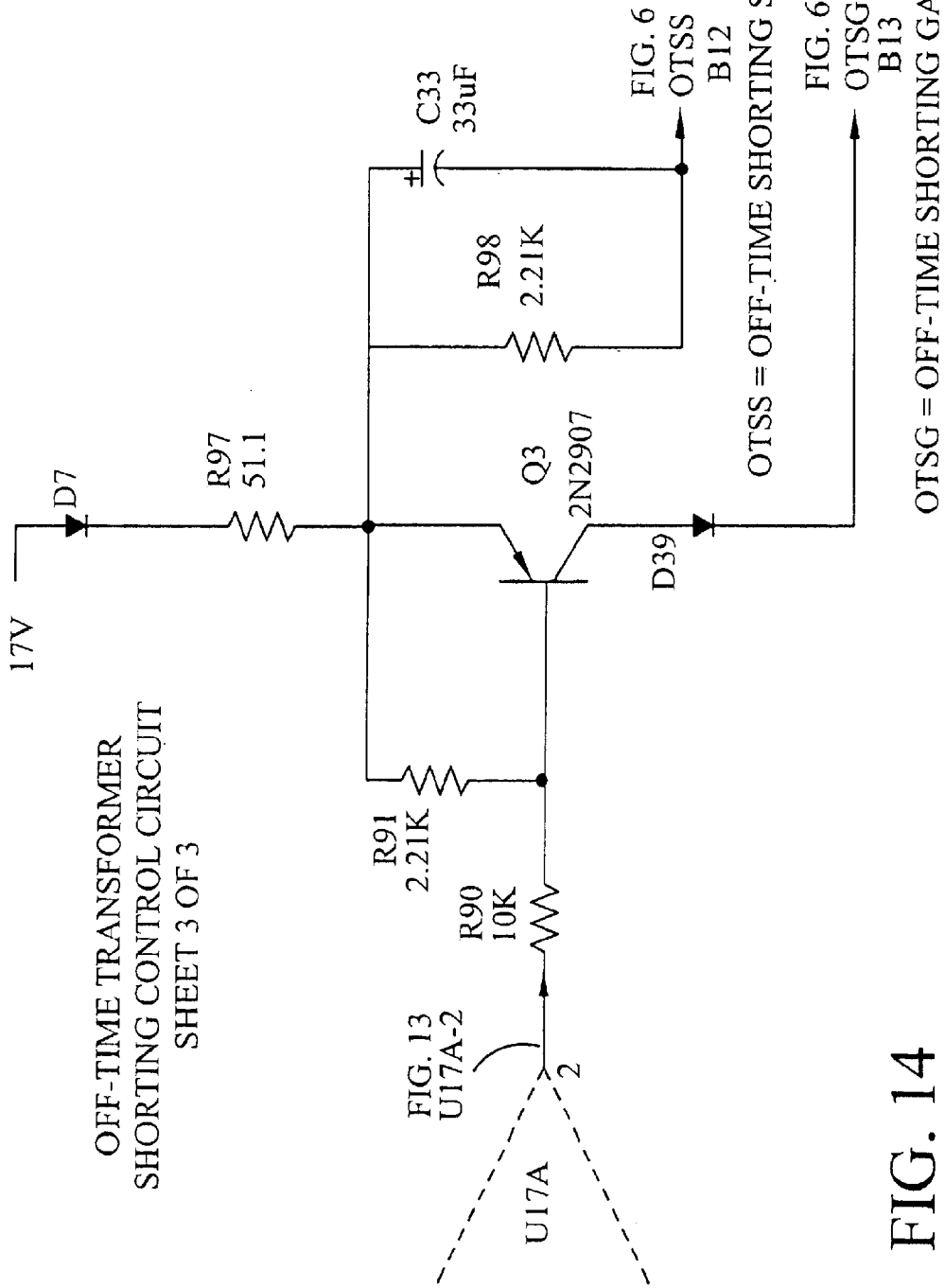

As shown on FIG. 14, U17A-2 drives the Q3 PNP transistor into conduction as its output goes low. As Q3 turns on, in response to a low on the M11 signal line, it pulls the OTSG signal line high. FIG. 6 shows that a high on the OTSG signal line pulls the gates of the shunt FET switches high with respect to their gates on both the Left Power Board and the Right Power Board. A total of 8 FET switches are thereby transferred to the conductive state and thereby connect the left and right end terminals of the main power transformer together during the dwell time when the left and right side power switches are in the off state.

Each FET has a plastic body coupled to a metal mounting tab. Each FET has a gate, a drain and a source lead extending from is respective plastic body. The drain lead of each FET is electrically common with its respective metal mounting tab. The metal mounting tabs of each FET is pressed against a strip of insulating material that is coupled to the respective aluminum base plate. The insulating material is pregreased Kapton called ISOSTRATE, and is made by the Power Devices Corporation, of Laguna Hills, Calif. The strip of insulating material prevents electrical contact between the drain and the large aluminum base plate. The three leads of each FET are formed for insertion into printed circuitry on the outer surface of the respective first or second power FET circuit board. A strip of high durometer neoprene rubber material made by 3M Company, part number: SJ6008, is inserted between a plane formed by the plastic bodies of the FETs and the respective power FET circuit board outer surface. A high durometer rating implies that the material compresses only slightly under load.

Mounting screws are inserted through the power FET circuit board inner surface to its outer surface and then to the respective aluminum base plate to force the power FET circuit board toward the respective large aluminum base plate, the neoprene strip being compressed between the power FET circuit board outer surface and the plastic bodies of the FETs, the plastic bodies transferring the load imposed by the neoprene strip to the metal tabs thereby pre-loading the tabs against the insulation strip on the large aluminum base plate. Three screws are used to force the circuit board against the neoprene strip and thence against the plastic bodies of the row of ten FETs thereby obtaining fairly even pressure.

The circuits shown on FIGS. 1, and 3 through 14, except for the switches, the shunt switches, the transformers 12 and L1 are located on a control module (not shown) that is coupled to the inner surface of one of the power FET circuit boards. Two bolts (not shown) are used on the lower edge and three are used along the top edge to secure the control module. Two Zshaped brackets (not shown) are used to position and couple the control module to the power. FET circuit board. Power cables pass through the rear wall of the vertical U-Shaped frame of the power supply.

Figure 4:
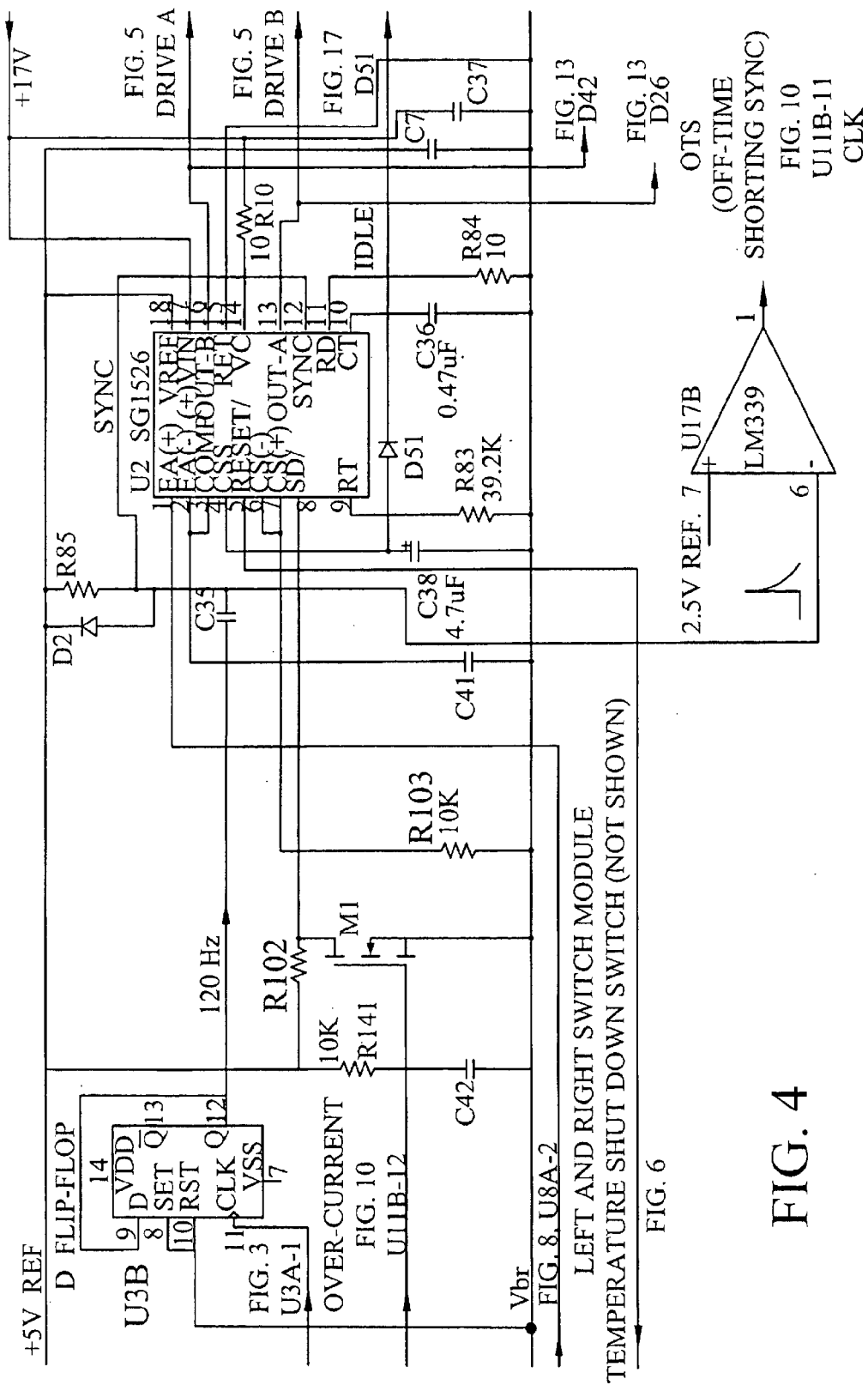
Figure 5:
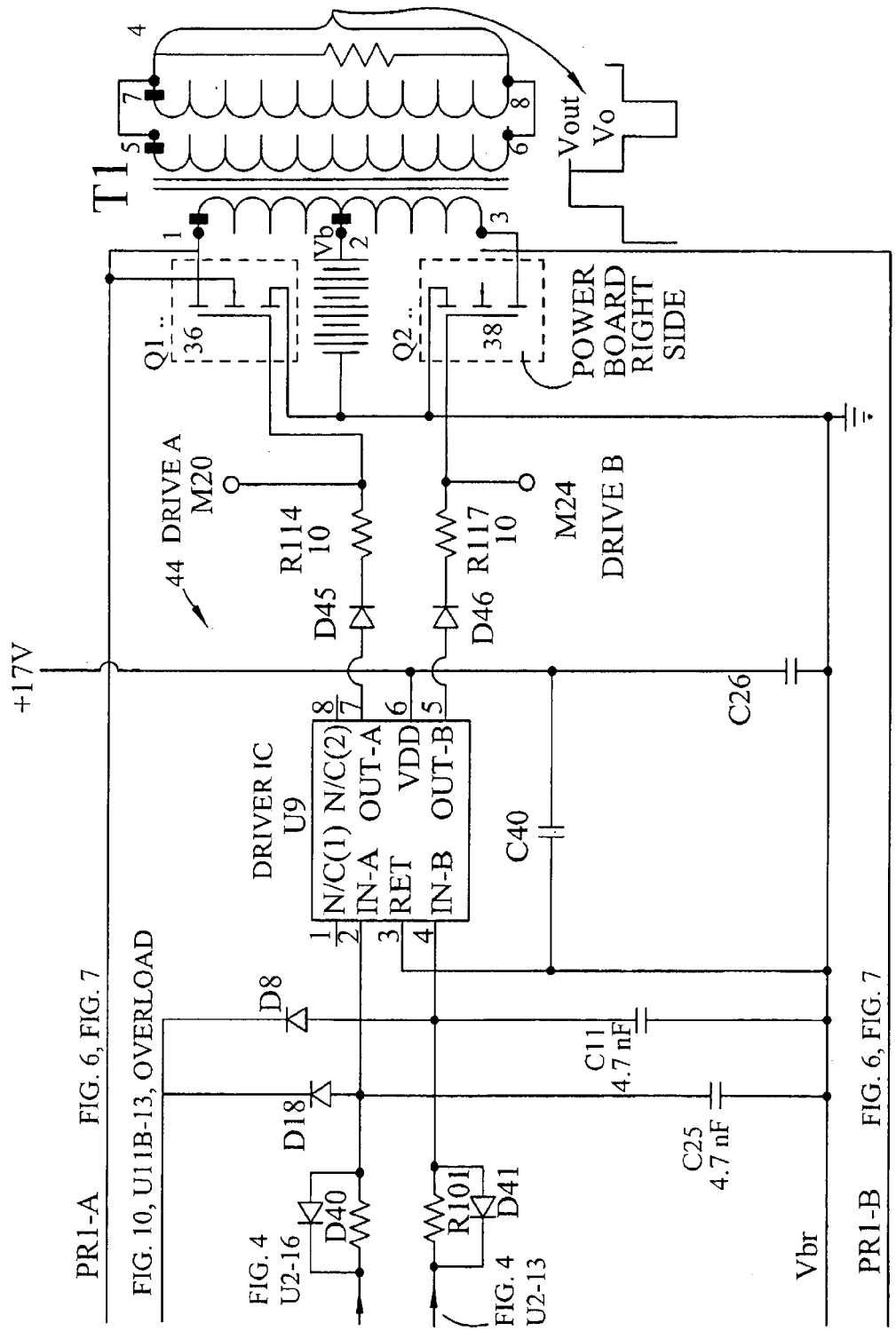

Referring again to FIG. 1, block 42 with the legend "PWM OSCILLATOR PULSE WIDTH MODULATOR AND DRIVER U2, U9)" represents a pulse-width modulator, such as the SG1526 shown as U2 on FIG. 4 and a driver circuit, such as the DRIVER IC 44, U9, a TC427, shown on FIG. 5. The DRIVER IC 44 is shown in a circuit arrangement for driving the first switch 36 and the second switch 38 alternately into conduction for each on-time. Referring again to FIG. 2, the on-time of the first FET switch 36 is shown as interval C(1) in response to the DRIVE A signal going high. The on-time for the second FET switch 38 is shown as interval D(1) in response and on-time the DRIVE B waveform. FIG. 2 shows alternate DRIVE A and DRIVE B waveforms during alternate and succesive half cycles identified by arrows and C(2), D(2) in a succesive power cycle. The PWM 42 imposes a dead-time, such as the interval identified with arrows as E and F as a non-conductive interval between the first and second on-time intervals G and H and during the interval preceding the start of any subsequent first on-time interval.

Figure 3:
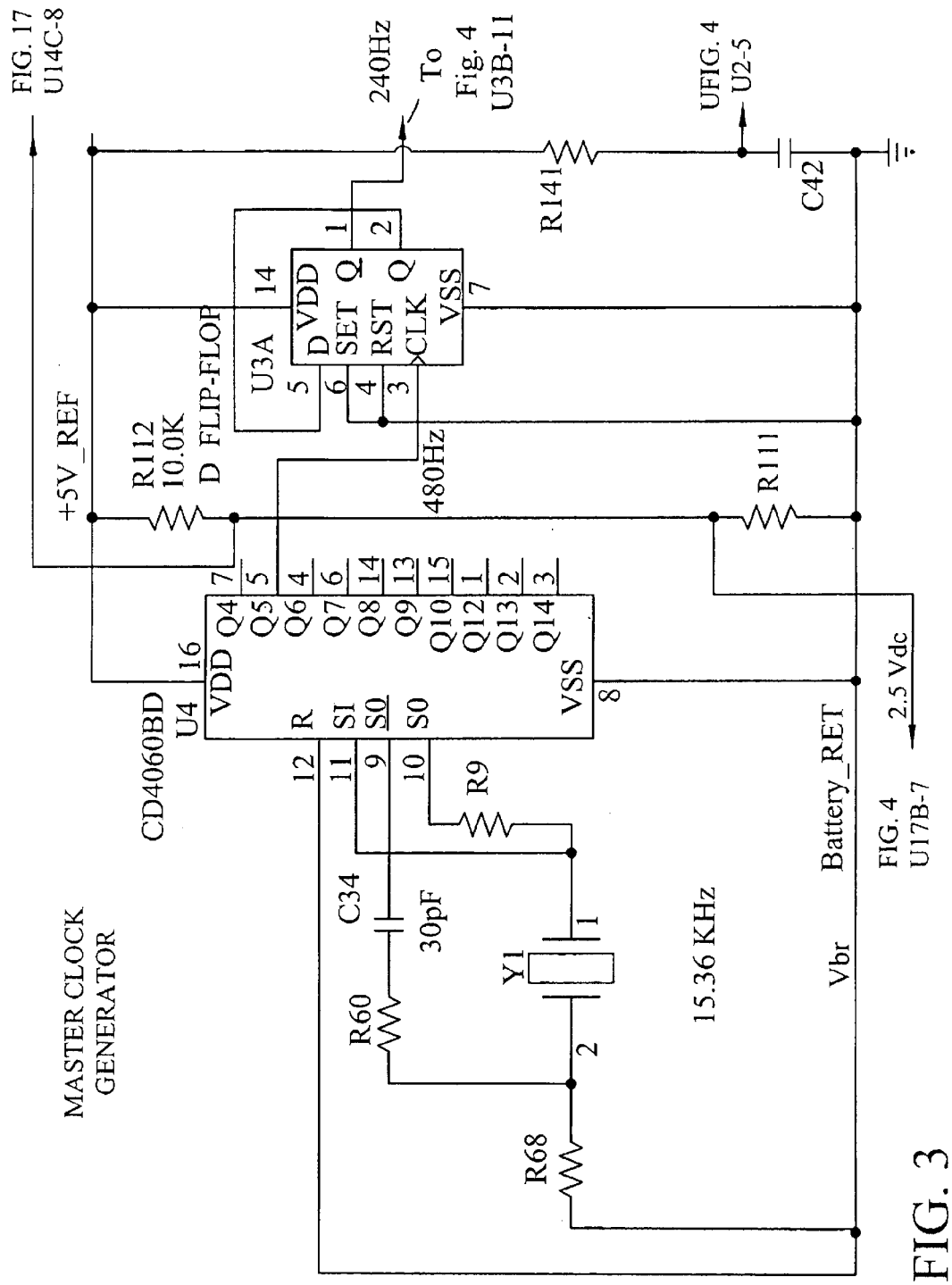
FIGS. 3, 4 and 5 are circuit schematics of portions of the clock and pulse-width modulator circuit driving transformer T1.

FIG. 4 shows the PWM using an SG1526 which has an internal oscillator, however, in the present aplication, as shown on FIG. 3, the component Y1, is a CX-1H-03 tuning fork resonator that oscillates at an audio frequency of 15.36 KHz is used as shown on FIG. 3 to form a clock circuit that has greater precision. FIG. 3 shows IC U4, a 4060 CMOS chip is connected to the Y1 device in a circuit to divide the frequency down to 480 Hz. D type flip-flop. The U3A flip-flop divides the frequency down from 480 Hz to 240 Hz. On FIG. 4, the output of U3A-1 is connected to the clk input at U3B-11. The U3B flip-flop divides the 240 Hz signal down from 240 Hz to a 120 Hz clock signal. The 120 Hz signal is shaped by C35 and R103- and is then applied to the PWM IC U2-7 to synchronize the internal clock of the PWM to 1.20. Hz. The U2 PWM IC provides the DIVE A signal at U2-13 and the DRIVE B signal at U2-16 to the DRIVER IC U9 pins 2 and 4 respectively via coupling resistors R100 and R101 on FIG. 5.

Figure 7:
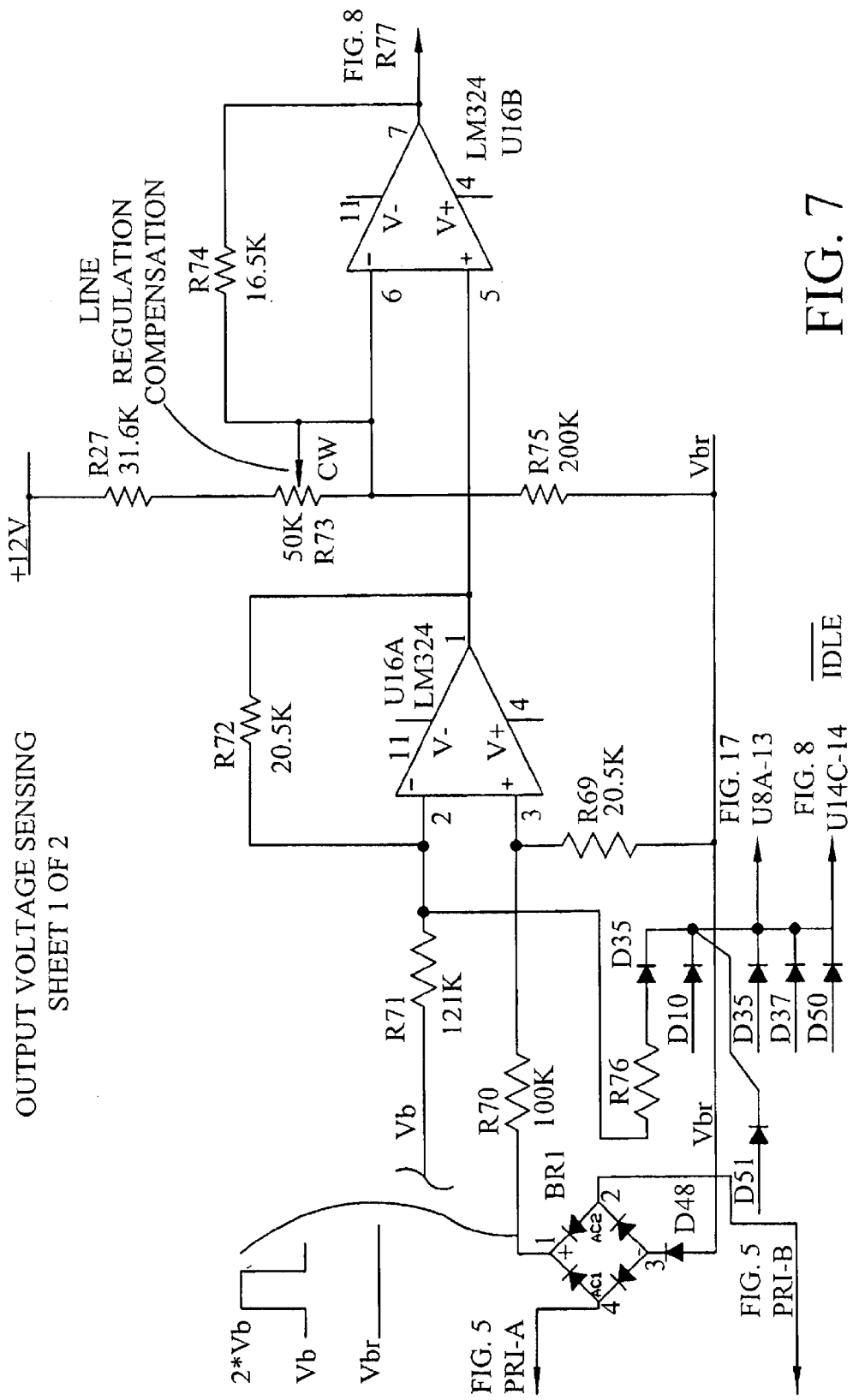
FIGS. 7, and 8 are schematics of the primary winding voltage sensing and volt second averaging circuit used to provide a control voltage to the PWM.
Figure 8:
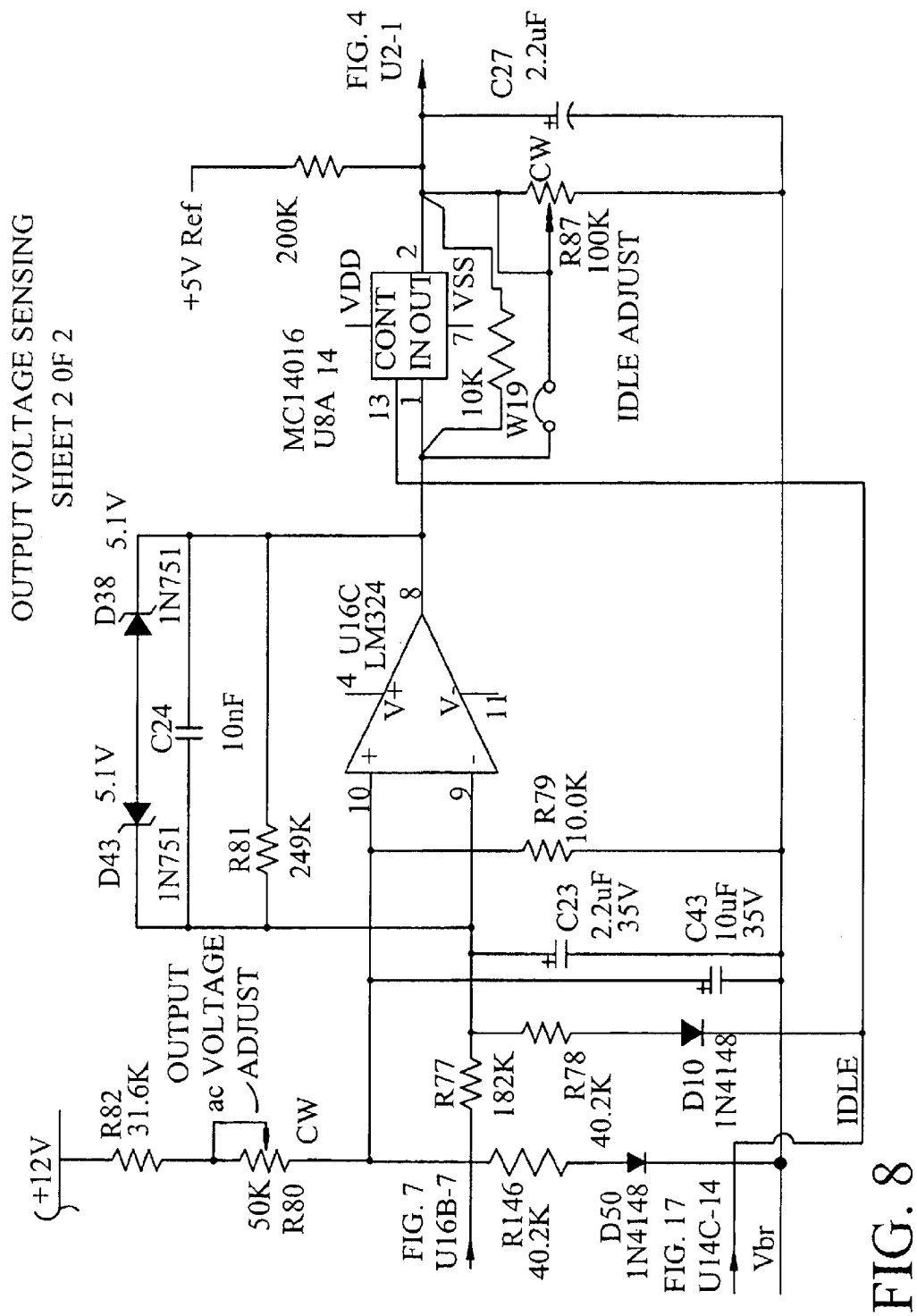

FIG. 7 shows Amplifiers U16A, U16B and FIG. 8 shows U16C and U8A on FIG. 8 comprise a control circuit for sensing the one-time voltage on the non-conducting second end or non-conducting first end of the primary winding during each on-time of the respective conducting first or conducting second switch. The voltage on the non-conducting end of the primary during an on-time includes a reflection of approximately twice the output voltage on the open circuit end of the winding. The sensed voltage is nominally twice the 28 Vdc level or 56 Volts peak volts on the non-conducting end during an on-time. The sample is taken in a half cycle period, in this push-pull design, which includes both, the on-time and the off-time interval. The samples are volt-second averaged by the low pass filter formed by R77 and C23 on FIG. 8 to form a control signal voltage on C23 Amplifier U16C scales and buffers the control signal on C23 and couples it via analog switch U8A to the EA+ input of the PWM at U2-1 to modulate the on-time of the first and second switch to maintain the quasi-square wave output voltage across the secondary to be within a predetermined volt-second range.

U16 is a quad LM324 Op Amp. Three stages are used in the AC Regulation Feedback Loop. U16A is a level shifting circuit translating the 56 V peak level down to about 10V. U16A also translates the minimum level of 28V during the non-conducting off-time periods down to the control circuit reference level or circuit ground 20. The waveform at U16A-3 is a scaled down signal that is nominally switching from about 0 to 10 V during on-times. The signal at U16A-3 goes up and down with the output pulses that results in a stream of analog output voltage pulses that are referenced to a control signal ground. The output of U16A-3 at is fed to the inverting input of U16B, which adds a little DC into the signal that helps the load regulation.

U16C is the error-amp stage that is the main regulator that controls level of the ac output voltage to keep it at 120 Vac. Adjustable resistor R8 on the non-inverting input of U16C is the voltage adjustment for the 115 Vac output voltage. The resistor R8 is supplied from a precision 12 V reference. The inverting input at U16C-9 receives a signal from the output of U16B-7. The output of U16C-9 is coupled to an MC 14016 at U8A-1, an analog switch that is in series with the error amp output. The U8A analog switch provides a means for opening the control signal loop in response to an over-current condition. The control signal at the U8A-2 output is typically in the range of 0–4 volts.

Figure 10:
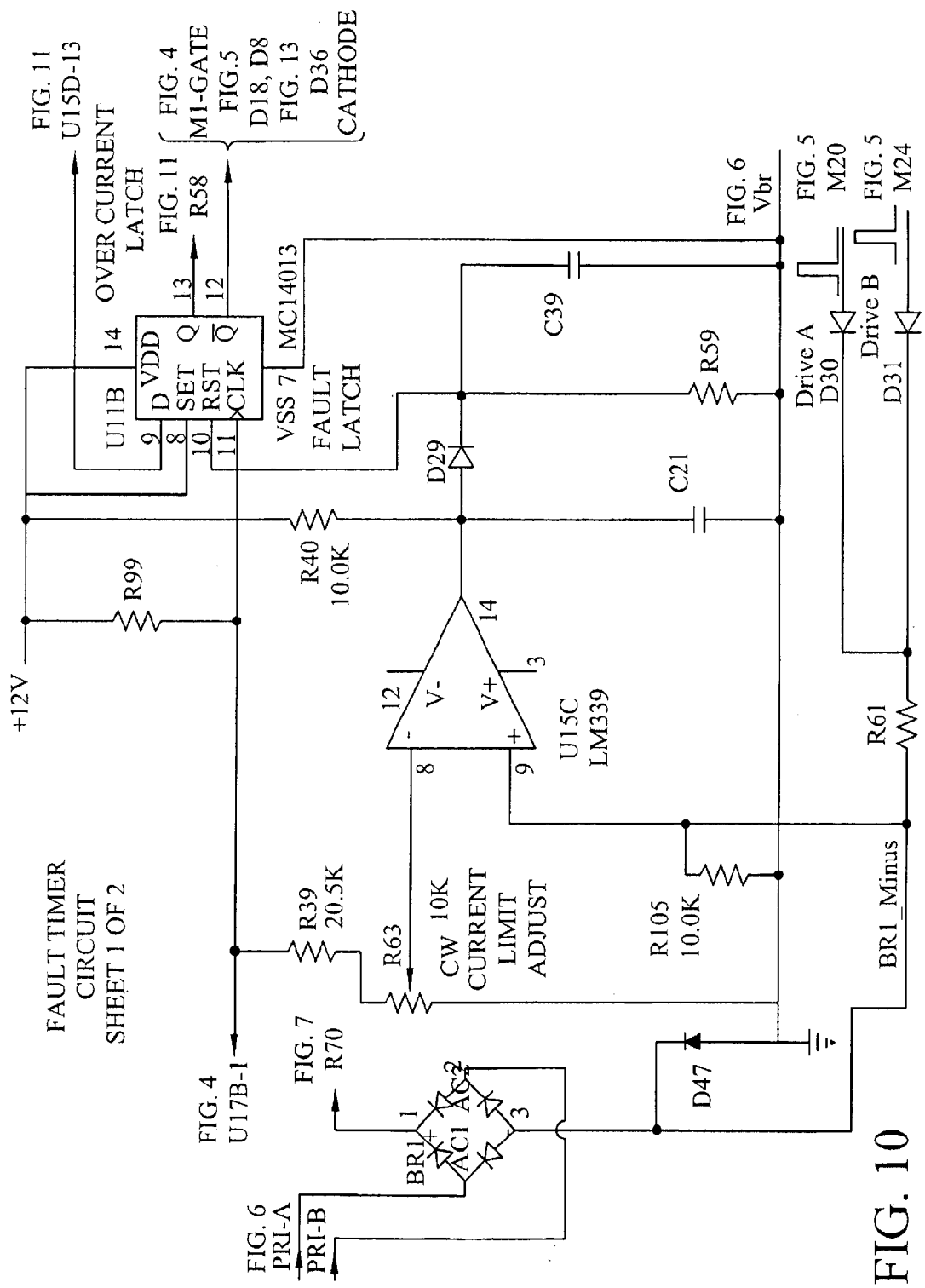
FIGS. 10 and 11 are schematics of the current overload detection circuit.
Figure 11:
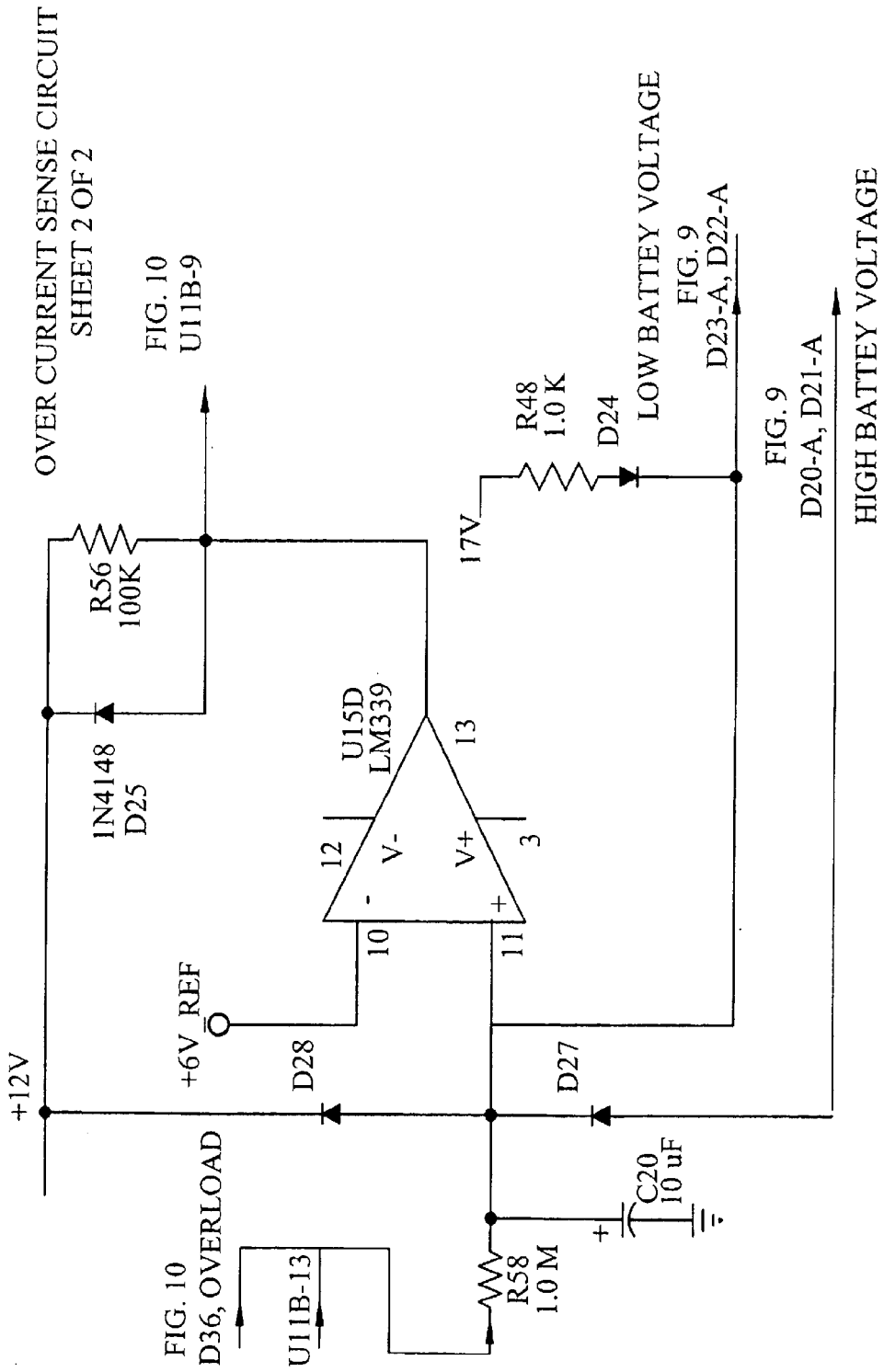

FIGS. 10 and 11 show a how current sensing is achieved using the on-resistance of the first and second FET switches within phantom blocks 36, 38 on FIG. 6. A turns ratio related increase in load current is reflected to the primary of transformer t1 within phantom block 12 that passes through the power FETs producing a load current related voltage rise during the on-time. The load current is measured by measuring the on-time voltage on the conducting first end or second end of the primary winding with respect to the ground return line (Vr) during the on-time of the respective first or second switch, and for terminating the pulse-width modulator and drive circuit on-time in response to a predetermined on-time voltage threshold being exceeded.

The signal is sensed and rectified by the lower diodes in bridge BR1. The output of the lower diodes in BR1 is passed to comparator U15C which compares the resulting rectified signal with a dc level that is adjusted using R63 to set the threshold level. The threshold is set to not exceed 2.5 volts.

The circuit is synchronized to make the measurement of the voltate across the first and second switch 36, 38 as the respective switches are in a conduction mode. The sense voltage across the first and second switch is gated on when the respective FETs are conducting U11B is an MC1403D flip-flop used to perform a latching function in connection with an output from comparator U15D-13 as it receives a sync signal from comparator U17B-1 that originates at D flip-flop U3B-2 in the oscillator circuit on FIG. 4. The output of U15D-13 goes high at the instant the current through the either the first or second switches exceed the predetermined limit threshold established by adjustment of R63 on FIG. 10. The U15D comparator on FIG. 11 provides the function of a one-shot multi-vibrator in the present application. The Q output of U11B-13 flip-flop goes low to indicate an Over Current condition or an Overload.

The U15D comparator on FIG. 11 and the U11B flip-flop on FIG. 10, in combination, form a timing circuit. The timing function of the circuit controls the time that the converter is allowed to continue to run after the detection of an over-current or fault condition. This delay accommodates the typical surge requirement of a motor starting into an initial locked rotor or the high initial input current to the filament of a lamp load. The delay is typically a few seconds or long enough to permit a motor to come up to speed and run or a lamp to light without tripping the timer and latching the circuit into an overload condition. The U15D-13 output is connected to the D input of U11B-9 flip-flop.

Figure 13:
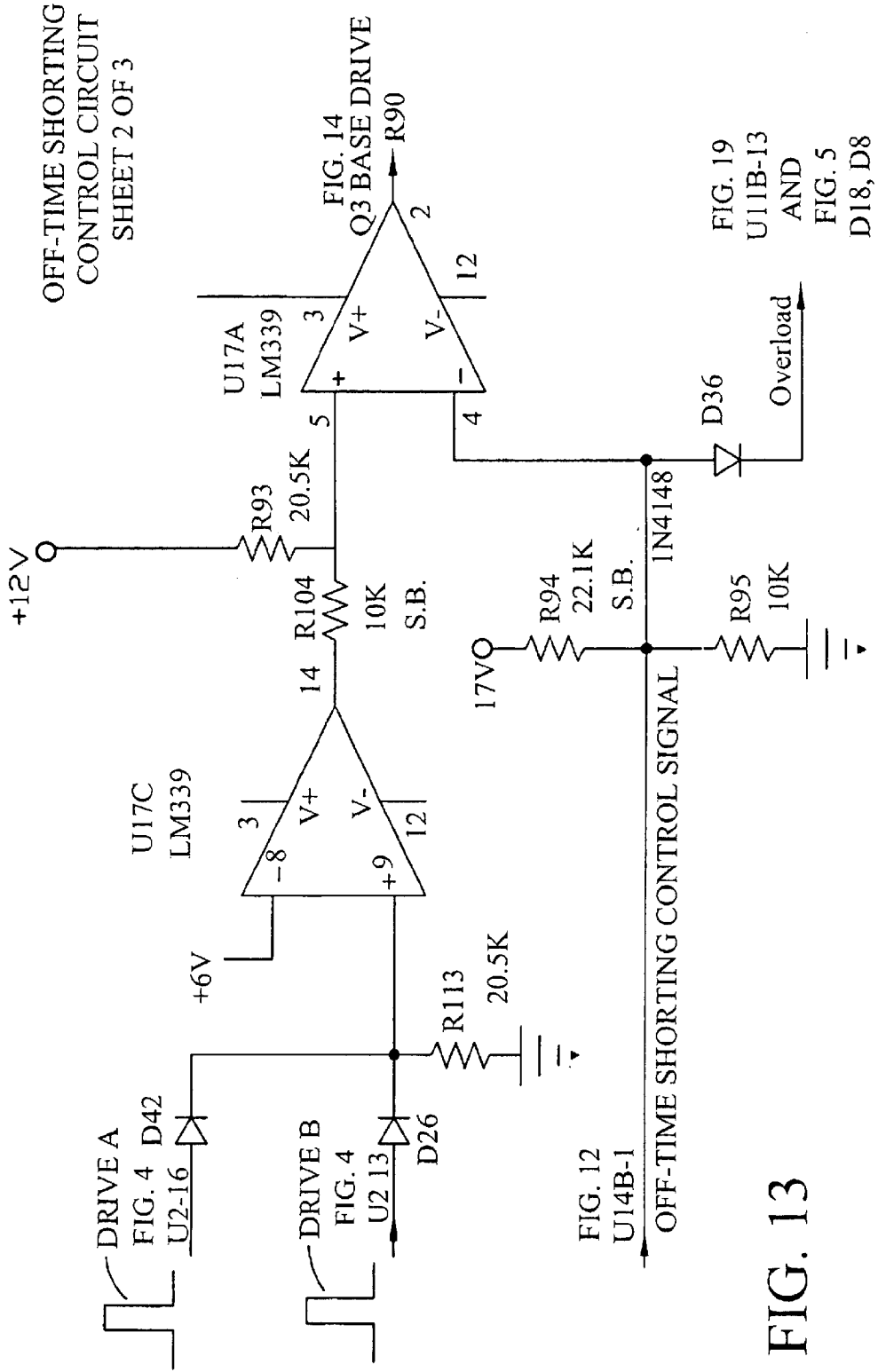

Under normal conditions, C20, shown on FIG. 11, is charged by current from the overload signal line from the 171 supply and R94 via diode D36 shown on FIG. 13. The normal output condition of U11B-12 is low with U11B-13, the Q output being high. The normal output condition of comparator U15C-14 is high in response to a high on its non-inverting input from the voltage on C20. A high at the D input continues to be transferred within the flip-flop to the output with each clock pulse. As an over-current state is detected, the output of U15C-14 goes high which is coupled to the RST (reset) input of U11B-10. A high on the reset input with a zero on the SET input term, (it is grounded) forces the Q term at pin 13 low and the Q bar term at pin 12 to a true or high state without the necessity of a clock. A high out of the Q bar output turns on FET M1 which immediately reduces the on-time from the PWM. The low on the Q11B-13 Q term starts the discharge of the capacitor C20. If the over-current condition is removed, the Q11B flip-flop reverses its reset state to the set state at the following clock pulse. If the over-current condition-persists, the charge on C20 is eventually lost resulting in the output of comparator U15D-13 going, low. Once U15D-13 is low, and is held low by the discharged state of C20, removal of the over-current state with a corresponding removal of the high into U11B-10 will not cause the state of the flip-flop to change. At the next clock, the low state from U15D-13 to U11B-9 transfers to the Q output of U111B latching the system into a state requiring a reset by forcing the voltage on C20 to a value above the threshold of the 1115D reference input. A reset switch is shown for connecting node M17 to M23 to force a reset through diode D27 on FIG. 9.

Figure 9:
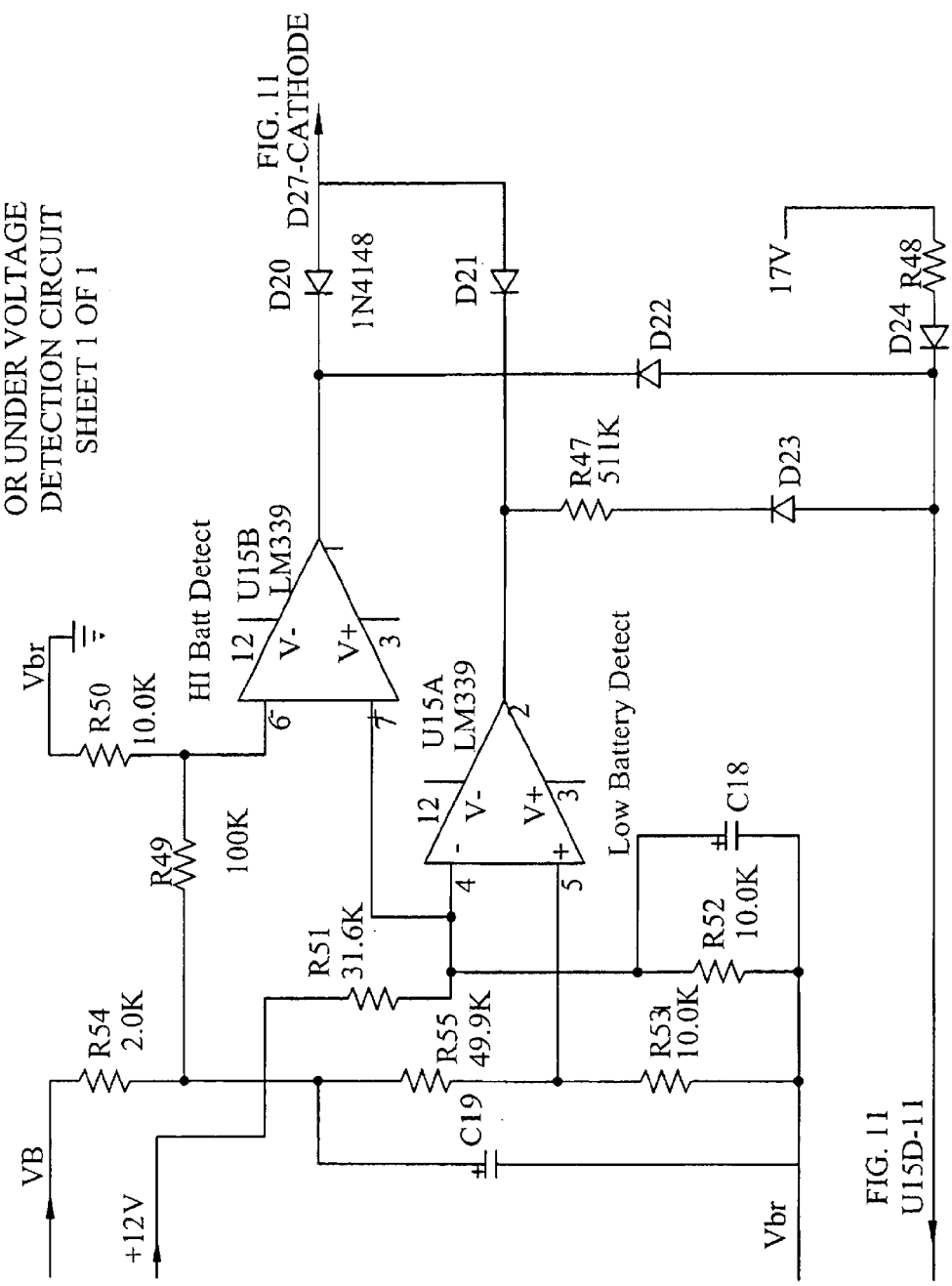
FIG. 9 is a battery high or low voltage detection circuit.

FIG. 9 shows a high and a low voltage source or battery voltage detection circuits. If the battery voltage drops below 18 Vdc, inverter operation is terminated so as not to kill the battery. If the battery voltage is above 33 Vdc inverter operation is terminated to prevent output voltage from overstressing to the loads coupled to the outputs of the inverter. A high input voltage will cause the inverter operation to shut down instantly. A low voltage detect signal will not terminate inverter operation immediately to accommodate line drops due to high current start loads. File U15D timer controls the delay, which is set to about 7 seconds. Indicator lights are provided.

Low Battery Voltage Detection Circuit

Referring now to FIG. 9, U15A is a comparator that is referenced to a portion of the +12 Vdc supply. A portion of the battery voltage Vb is tapped off the node between R55, and R53 and coupled into U15A-5. As that voltage drops below the portion of the reference voltage at U15A-4, the output state of the comparator at U15A-2 changes from a high to a low. To a low to indicate a low battery voltage is detected, a time delay and interrupt circuit start timing out. The time out is controlled by the value of R47 via diode D23 on FIG. 9 and the voltage and size of C20 on FIG. 11. The circuit compares the voltage source voltage (Vb) when measured respect to the ground return line (Vr) with a predetermined low voltage source reference voltage, such as a portion of the +12 Vdc supply, and outputs a low voltage source signal in response to the voltage source voltage falling below the predetermined low voltage source voltage limit, low voltage signal being coupled to the over-current delay and latch circuit to set the over current latch after a predetermined time delay.

HIGH BATTERY VOLTAGE DETECTION CIRCUIT

Referring now to FIG. 9, U15B is a comparator that is referenced to a portion of the +12 Vdc supply. A portion of the battery voltage Vb is tapped off the node between R51 and R52 and coupled into U15B-7. As that voltage drops below the portion of the reference voltage at U15B-5, the output state of the comparator at U15B-1 changes from a high to a low to indicate that a high battery voltage is detected. The circuit outputs a low logic level signal out of U15B-1 in response to the voltage source (Vb) voltage rising above the predetermined high voltage source threshold limit, The low logic level signal out of U15B-1 is coupled to the over-current delay and latch circuit on FIG. 8 at C20 via diode D22 to set the over current latch with no predetermined time delay.

Power Board Left and Right Side

FIG. 6 shows two Off-time Shorting FET switches F01 andF02 in the Left Power Board and two Off-time Shorting FET switches F01 and F02 in the Right Power Board. There are eight Off-time Shorting Switches in total. The Off-time FET shorting switches conduct in both directions via the normal conduction channel formed by the gates going positive with respect to the conduction channel between the source and the drain with current passing from the drain to the source. The body diode permits current flow in the in each device in the reverse direction. In addition to the eight Off-Time Shorting Switches, sixteen FET power switches operating in parallel on each end of the main power transformer T1 for a total of thirty-two FET power switches in the preferred embodiment for a 2500 Watt output capability obtaining power from a nominal 24 Vdc battery stack.

Output Load Current Low Limit Detection Circuit

Figure 15:
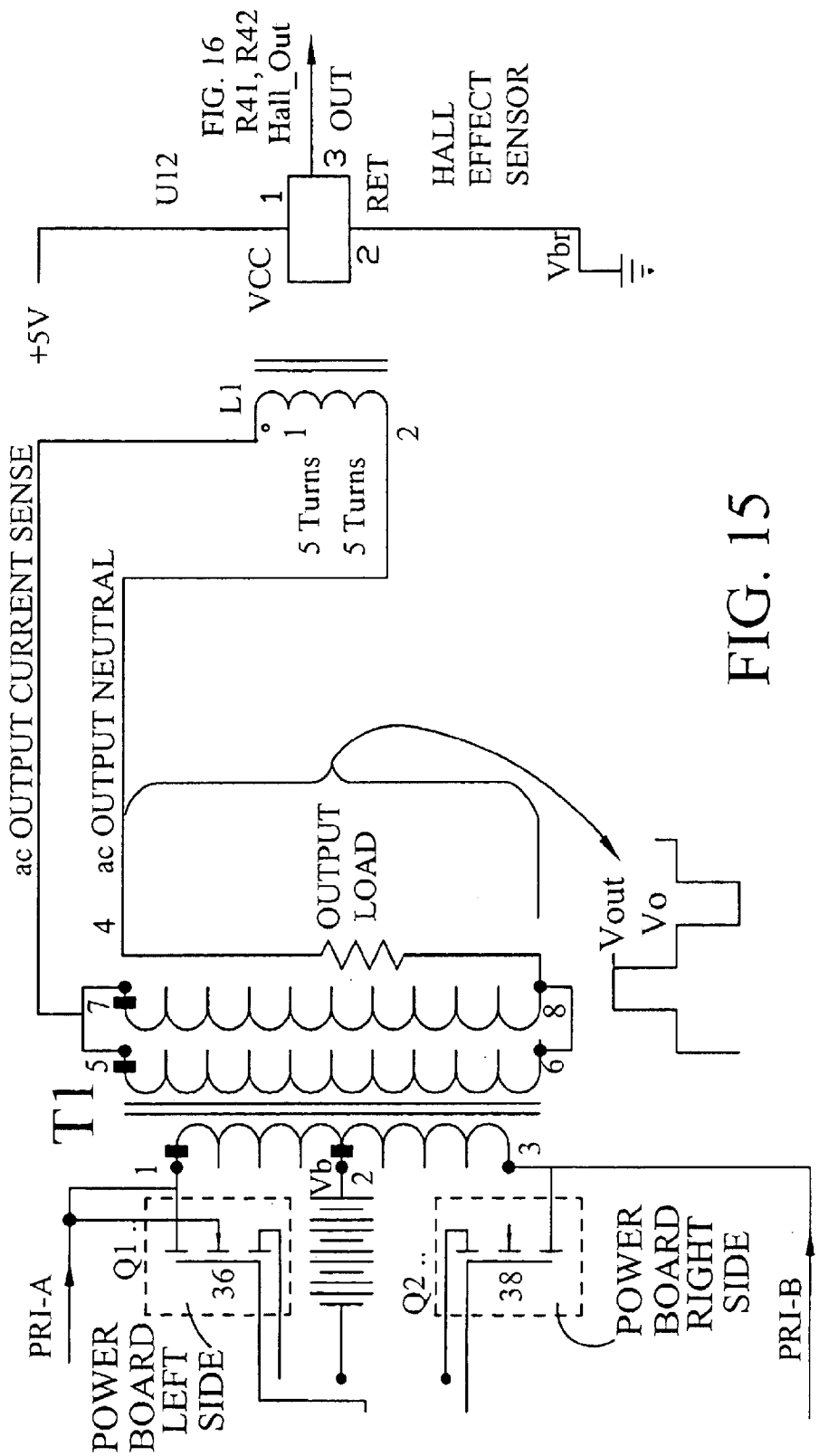
FIGS. 15, 16 and 17 are schematics of the Hall Effect output load current sensing circuit.
Figure 16:
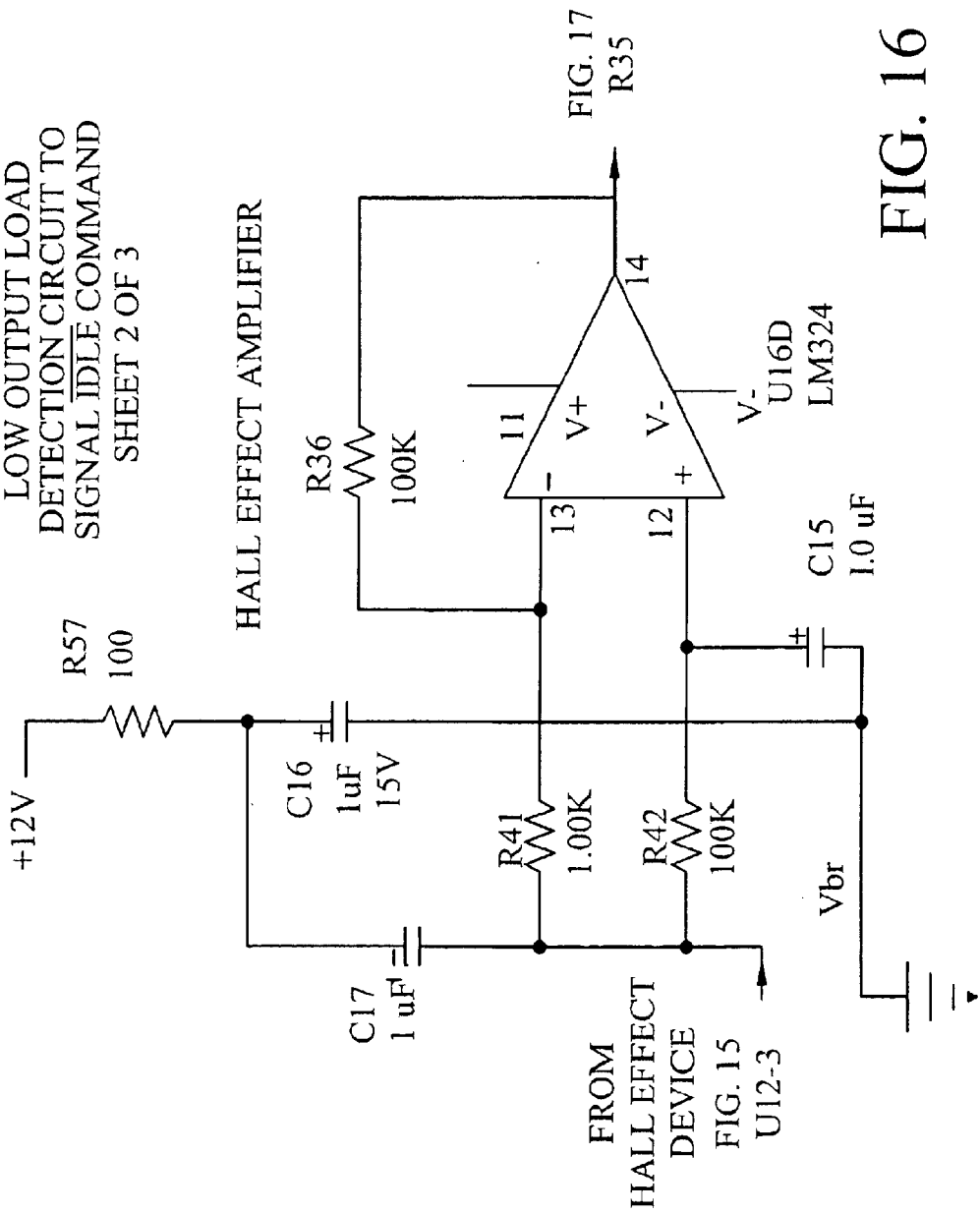
Figure 17:
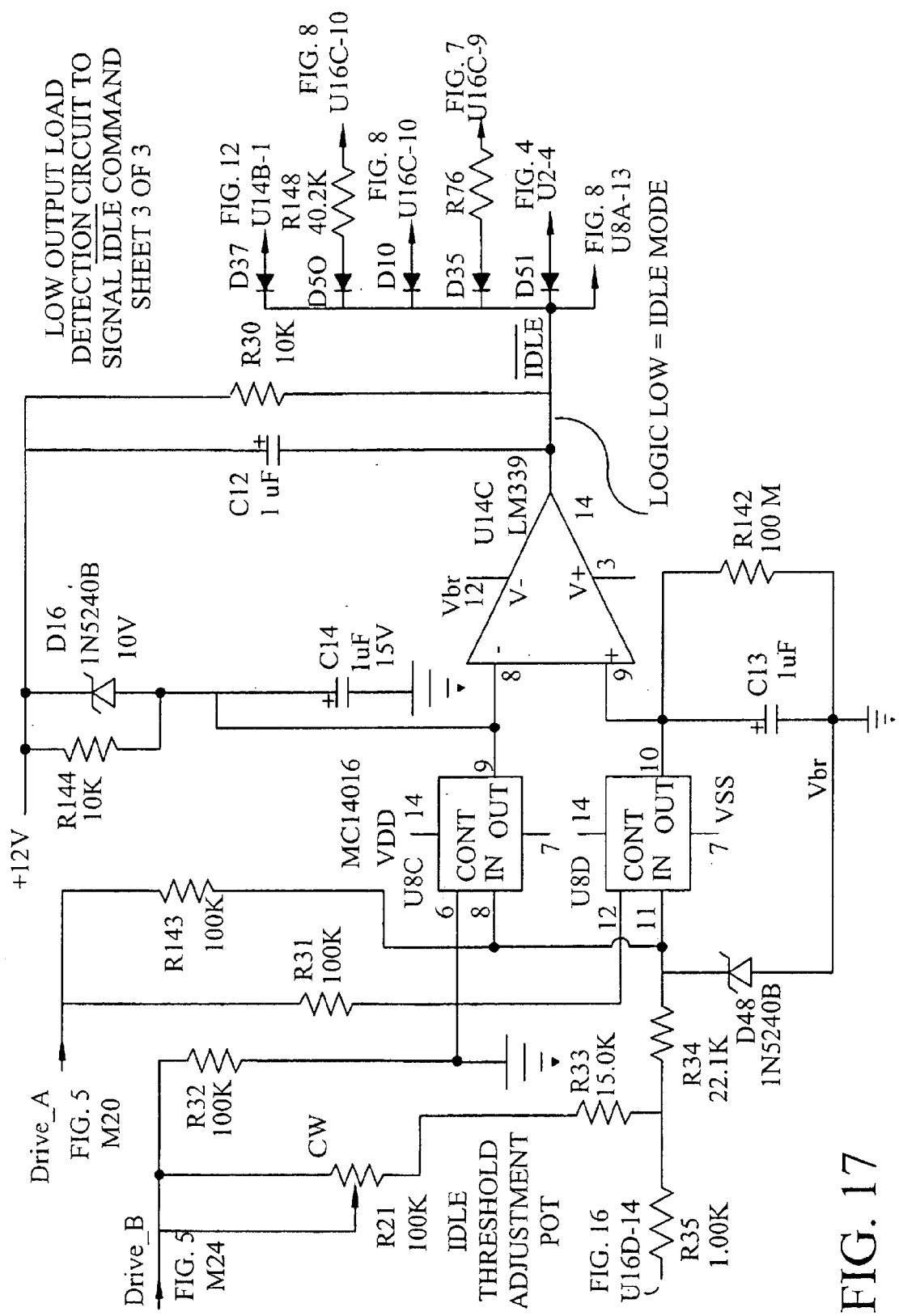

FIGS. 15, 16 and 17 are schematics of the output load current low-limit detection circuit for measuring the output load current and for interrupting the shunt drive signal when the measured output load current is below a predetermined limit to conserve operational power dissipation. FIG. 15 shows a schematic of a Hail Effect device U12 inserted into a slot cut into the core. A center-taped winding is placed on the core. The center tapped winding has a first and second end. Each half of the winding has five turns. The first end of the winding is connected to the return from the first power module sources "S" to connect that return in series with the first half of the winding. The second end of the winding is connected to the return from the second power module sources "S" to connect that return in series with the second half of the winding. The center tap is connected to the battery return Vr The Rail Effect device is into a slot (not shown) cut into the core.

The Hall Effect device is powered from the +5 Vdc supply and provides a signal to the input of operational amplifier U16D-13, a quad LM 324 amplifier, shown on FIG. 16. U16D has a nominal gain of 100. The non-inverting input is coupled to ground via capacitor C15 which operated to allow the amplifier to float and find its own operating or bias point. R42 and C15 combine to form a low pass filter with a very low roll off frequency. The non-inverting input to U14D-12 rises to the average voltage on the output of the Hall Effect device. The average voltage on C15 then becomes the operating point for the U16D amplifier. The third and fourth stage of the output load current low limit detection circuit is shown on FIG. 17 where comparator. U14C receives the scaled input from U16D-14 via analog switch U8D-11. Drive A and B signals gate inputs into analog switch U8C and U8D.

Idle Mode

The component used is an OHS3150U. It was originally a component made by Sprague but the part or its equivalent continues to be commercially available. The Idle Mode is entered when the output power from the power supply as sensed by L1 and U16D falls below approximately 5 watts. As that threshold is crossed, the circuit comprised of U14C produces a low signal on the idle signal line that terminates the drive to the shorting circuit on the primary winding and reduces the pulse width out of the PWM, both functions being characterized to reduce the operating current from the battery from a low value of about 1.5 A to about 70 mA by interrupting the primary shortinig circuit and by reducing the pulse width Out of the PWM to a low value.

The output of U16D in the output current monitor circuit provides a voltage that replicates the waveform of the current passing through the windings on the inductor L1. The normal voltage gain of U16D is the quotient of R36/R41 which is typically 100. However, multiplexer switch U8B is turned on in the idle mode when power conserved to preserve energy stored in the battery stack. When U8B is conducting, it connects R37 to be in parallel with R36 thereby reducing the gain from 100 to about 5. The output of U16D-14 is coupled via R35, R34 and multiplexer switch U8D to thle non-inverting input of U14C-9.

Comparator U14C is shown on sheet 12. Multiplexer switches U8C and U8D control the inputs seen by the U14C comparator. U8C and U8D are part of an MC14016B multiplexer or analog switch. When the control voltage to the control pin is high, the multiplexer is in its conductive tape. The U8D switch is turned on by the positive going, voltage on the drive A signal line. A portion of the ac output current signal out of U16D14 is added to the positive drive A signal line signal. The U8C switch has its control input grounded so the U8C switch remains off. U14C-8 is connected to a 2.5 Vdc supply. As the combined input to the positive input of U14C drops below the 2.5 Vdc level, the output of 14C goes low. A low on the output of U14C is the idle under bar signal that is used to reduce the power being used to run the power supply. The idle signal line is coupled to the cathode of D51 under the U2 PWM IC on FIG. 4.

The output of U14C-14 is pulled high by R30. C30 is in parallel with R30. When the output of U14C goes high, the output transistor turns off allowing the voltage to be pulled high by resistor R30, also on FIG. 17; however, thle rise of the voltage on U14C is slowed by the discharge of C12 through R30. If the output at U14C-14 is low, it pulls down the voltage into the U2-4, the CSS signal line. The on time of the PWM goes zero or near zero in response to a low on U2-4 which reduces the pulse width out of U2 and thereby also reduces the pulse width of the outputs of driver U9, the drive. A and drive B signal lines, to a miniLImu. Once the output of U14C goes high, it allows the input into the U2-4, the CSS term, to rise slowly thereby providing a soft start.

The signal line is called the idle' or idle under bar. The Idle' signal line and it is coupled to the PWM, U2-4 via diode D51 and C34, a 4.7 uF electrolytic used for dampening the rate of rise of voltage changes on the U2-4 control input. If the Idle' signal line goes low out of U14C-14, it discharges the soft start capacitor C38 via D51 forcing the PWM into a low duty cycle state of operation immediately. When the idle' line releases the voltage on U2-4, the soft start capacitor provides a slow rise in voltage on the control input to the PWM which translates into a soft start.

The 17I Voltage Source

Referring to FIG. 16, the voltage sources that operate the circuitry are derived from the battery voltage Vb and the return is Vbr. A+12 Vdc supply is obtained from a three terminal regulator of the 7805 type available from National Semiconductor. A +5 Vdc three terminal regulator is positioned in the path of the service supply Vb for the +12 Vdc supply. The return for the +5 Vdc supply is connected to the +12 Vdc output. The output of the +5 Vdc supply positioned with its return on the +12V is the sum of the two regulators or +17 Vdc and is referred to on the drawings as the +17I voltage level.

Cascading of Power Supply Outputs

The use of the SG1526 as a PWM helps reliability and reparability of the unit. The use of the military type crystal in the clock circuit improved the operating frequency of the powers supply. The use of the high-current power FET driver IC, U9 allows up to ten of the invention power supplies, which contain about 400 power MOSFETS, to be cascaded. Power supply units are cascaded by using a single pair of DRIVE A and DRIVE B signals from master unit with which to drive all slave unit power modules in synchronization. The secondaries are connectable in series for a higher output voltage or in parallel for an increased load current capabilities since all secondaries are isolated.

While certain specific circuits, relationship, materials and other parameters have been detailed in the above description of preferred embodiments, those can be varied, where suitable, with similar results. Other applications, and variation of the present invention will occur to those skilled in the art upon reading the present disclosure. Those variations are also intended to be included within the scope of this invention as defined in the appended claims.

What is claimed is:

1. A high output power inverter circuit coupled to obtain power from a voltage source (Vb) such as a battery service, the voltage source having a ground return line (Vr), the high output power inverter circuit comprising:

a toroidal transformer having a primary and a secondary winding, the primary winding having a first end, a second end and a center tap, the center tap being coupled to the voltage source, a first and second switch to conductively couple the first end and the second end of the transformer alternately to the ground return line (Vr) during alternate half cycles of successive power cycles for respective and successive first and second on-time intervals, the toroidal transformer secondary providine a quasi-square wave output voltage, a pulse-width modulator and driver circuit for driving the first and second switch into conduction for each first and second on-time during alternate half cycles of successive power cycles, and for interposing a dead-time or non-conductive interval between the first and second on-time intervals and during the interval preceding the start of any subsequent first on-time interval, a control circuit for sensing the on-time voltage on a non-conducting second end or non-conducting first end of the primary winding during the on-time of the respective conducting first or conducting second switch and for modulating the first and second on-time of the pulse-width modulator and driver circuit to maintain the quasi-square wave output voltage within a predetermined range, an output current-voltage sensing circuit means for measuring the load current by measuring the on-time voltage on the conducting first end or second end of the primary winding with respect to the ground return line (Vr) during the on-time of the respective first or second switch, and for terminating the pulse-width modulator and driver circuit first and second on-time in response to a predetermined on-time voltage threshold being exceeded.

2. The high output power inverter circuit of claim 1 wherein the output current-voltage sense circuit means further comprises:

means for measuring the load current by measuring a first and second on-time voltage on the conducting first end or the conducting second end of the primary winding with respect to the ground return line (Vr) during the first and second on-time of the first and second switch.

3. The high output power inverter circuit of claim 1 wherein the output current-voltage sense circuit means further comprises:

means for measuring the load current by measuring the on-time voltage on the conducting first end or the conducting second end of the primary winding with respect to the ground return line (Vr) during the on-time of the first or second primary switch, and a latch circuit characterized to toggle to an over-current state in response to a predetermined sensed voltage being exceeded, the over-current output state of the latch circuit providing an over-current signal to terminate the pulse-width modulator and driver circuit first and second on-time thereby turning off the first and second switches.

4. The high output power inverter circuit of claim 1 wherein the control circuit for alternately sensing the voltage on a non-conducting first end or second end of the primary winding during the on-time of the second or first switches and for modulating the first and second on-time of the pulse-width modulator and driver circuit to maintain an output voltage within a predetermined range further comprises:

a first and second amplifier coupled to receive, scale and filter the first and second non-conducting primary voltages to form a control voltage, the control voltage being coupled to an averaging filter to provide a filtered control voltage, the filtered control voltage being coupled to a pulse-width modulator and driver circuit control voltage input, the pulse-width modulator and driver circuit modulating the first and second on-time to minimize the difference between the filtered control voltage and a reference voltage to thereby maintain the output voltage within a predetermined range.

5. A high output power inverter circuit coupled to obtain power from a voltage source (Vb) such as a battery service, the voltage source having a ground return line (Vr), the high output power inverter comprising:

a toroidal transformer having a primary and a secondary winding, the primary winding having a first end and a second end and a center tap, the center tap being coupled to the voltage source, a first and second switch to conductively couple the first end and the second end of the transformer alternately to the ground return line (Vr) during alternate half cycles of successive power cycles for respective and successive first and second on-time intervals, the toroidal transformer secondary providing a quasi-square wave output voltage, a pulse-width modulator and driver circuit for driving the first and second switch into conduction for each on-times during alternate half cycles of successive power cycles, and for interposing a dead-time or non-conductive interval between the first and second on-time intervals and during the interval preceding the start of any subsequent first on-time interval, a control circuit for sensing an on-time voltage on a non-conducting second end or non-conducting first end of the primary winding during each on-time of the respective conducting first or conducting second switch and formodulating the on-time of the first and second switch to maintain the quasi-square wave output voltage within a predetermined range, and a shunt switching circuit for connecting the first end of the primary winding to the second end to the primary winding during a dead-time between each respective on-time.

6. The high output power inverter circuit of claim 5 wherein the shunt switching circuit further comprises:

FET shunt switches responsive to a shunt drive signal to connect the first end of the primary winding to the second end of the primary winding during the dead-time of the first and second switches.

7. The high output power inverter circuit of claim 5 wherein the control circuit further comprises:

a first and second amplifier coupled to receive, scale and filter the first and second non-conducting primary voltages to form a control voltage, the control voltage being coupled to an averaging filter to provide a filtered control voltage, the filtered control voltage being coupled to the pulse-width modulator and driver, the pulse-width modulator and driver modulating the first and second on-time to minimize the difference between the filtered control voltage and a reference voltage to thereby maintain the output voltage within the predetermined range.

8. The high output power inverter circuit of claim 5 wherein the shunt switching circuit further comprises:

a dead-time detection and shunt drive circuit having a first comparator coupled to compare the amplitude of the first and second non-conducting primary voltages with a predetermined portion of the voltage source (Vb) and to output a dead-time signal in response to the non-conducting primary voltage exceeding the predetermined portion of the non-conducting primary voltage, the dead-time signal being coupled to the shunt driver circuit to command the shunt switches into the conductive state.

9. The high output power inverter circuit of claim 5 wherein the shunt switching circuit is further characterized to provide a shunt drive signal to first and second FET shunt switches connecting the first end of the primary winding to the second end of the primary winding during the dead-time of the first and second switches.

10. The high output power inverter circuit of claim 5 further comprising:

an output current monitor circuit for measuring the output load current and for interrupting the drive signal to the shunt switching circuit when the measured output load current is below a predetermined limit to conserve operational power dissipation by interrupting shunt drive signal power during periods of very low output power.

11. The high output power inverter circuit of claim 5 wherein the output load current low limit detection circuit further comprises:

a center-tapped winding on a core having a first and second end, the first end being coupled to be in series with ground return and the first switch, and the second end being coupled to be in series with the ground return and the second switch, a slot being cut in the core, a Hall Effect device being inserted in the slot, the Hall Effect device outputting a load-current signal, a hall-effect amplifier being coupled to be responsive to the load-current signal for outputting a buffered and scaled load-current signal, a comparator responsive to the load current signal for comparing the load-current signal with a predetermined reference and for outputting a shunt interrupt signal to the shunt circuit to interrupt the shunt drive signal.

12. The high output power inverter circuit of claim 5 further comprising:

a low battery voltage, time delay and interrupt circuit for comparing the voltage source voltage (Vb) when measured with respect to the ground return line (Vr) to a predetermined low voltage source reference voltage and for outputting a low voltage source signal in response to the voltage source voltage falling below the predetermined low voltage source voltage limit, the low voltage signal being coupled to the over-current delay and latch circuit to set the over current latch after a predetermined time delay.

13. The high output power inverter circuit of claim 5 further comprising:

a high battery voltage interrupt circuit for comparing the voltage source voltage (Vb) when measured with respect to the ground return line (Vr) with a predetermined high voltage source reference voltage and for outputting a high voltage source interrupt signal in response to the voltage source voltage rising above the predetermined high voltage source voltage limit, the high voltage source signal being coupled to the over-current delay and latch circuit to set the over current latch with no predetermined time delay.

14. A high output power inverter circuit coupled to obtain power from a voltage source (Vb) such as a battery service, the voltage source having a ground return line (Vr), the high output power inverter comprising:

a toroidal transformer having a primary and a secondary winding, the primary winding having a first end and a second end and a center tap, the center tap being coupled to the voltage source, a first and second switch to conductively couple the first end and the second end of the transformer alternately to the ground return line (Vr) during alternate half cycles of successive power cycles for respective and successive first and second on-time intervals, the toroidal transformer secondary providing a quasi-square wave output voltage, a pulse-width modulator and driver circuit for driving the first and second switch into conduction for first and second on-times during alternate half cycles of successive power cycles, and for interposing a dead-time or non-conductive interval between the first and second on-time intervals and during the interval preceding the start of any subsequent first on-time interval, a control circuit for sensing an on-time voltage on a non-conducting second end or non-conducting first end of the primary winding during each first and second on-time of the respective conducting first or conducting second switch and for modulating the first and second on-time of the first and second switch to maintain the quasi-square wave output voltage within a predetermined range, an output current-voltage sensing circuit means for measuring the load current by measuring a first and second on-time voltage on the conducting first end or second end of the primary winding with respect to the ground return line (Vr) during the on-time of the respective first or second switch, and for terminating the first and second on-time in response to a predetermined on-time voltage threshold being exceeded and a shunt switching circuit for connecting the first end of the primary winding to the second end to the primary winding during a dead-time between each respective on-time.

15. The high output power inverter circuit of claim 14 wherein the control circuit further comprises:

a first and second amplifier coupled to receive, scale and filter the first and second non-conducting primary voltages to form a control voltage, the control voltage being coupled to an averaging, filter to provide a filtered control voltage, the filtered control voltage being coupled to the pulse-width modulator and driver circuit, the pulse-width modulator and driver circuit modulating the first and second on-time to minimize the difference between the filtered control voltage and a reference voltage to thereby maintain the output voltage within the predetermined range.

16. The high output power inverter circuit of claim 14 wherein the shunt switching circuit further comprises:

a dead-time detection and shunt drive circuit having a first comparator coupled to compare the amplitude of the first and second non-conducting primary voltages with a predetermined portion of the voltage source (Vb) and to output a dead-time signal in response to the non-conducting primary voltage exceeding the predetermined portion of the non-conducting primary voltage, the dead-time signal being coupled to the shunt driver circuit to command the shunt switches into the coductive state.

17. The high output power inverter circuit of claim 14 further comprising:

an output load current low limit detection circuit having a center-tapped winding on a core, the center-tapped winding having a first and second end, the first end being coupled to be in series with ground return and the first switch, and the second end being coupled to be in series with the ground return and the second switch, a slot being cut in the core, a Hall Effect device being inserted in the slot, the Hall Effect device outputting a load-current signal, a hall-effect amplifier being coupled to be responsive to the load-current signal for outputting a buffered and scaled load-current signal, a comparator responsive to the load current signal for comparing the load-current signal with a predetermined reference and for outputting a shunt interrupt signal to the shunt circuit to interrupt the shunt drive signal.

18. The high output power inverter circuit of claim 14 further comprising:

a low battery voltage, time delay and interrupt circuit for comparing the voltage source voltage (Vb) when measured respect to the ground return line (Vr) with a predetermined low voltage source reference voltage and for outputting a low voltage source signal in response to the voltage source voltage falling below the predetermined low voltage source voltage limit, the low voltage signal being coupled to the over-current delay and latch circuit to set the over current latch after a predetermined time delay.

19. The high output power inverter circuit of claim 14 further comprising:

a high battery voltage interrupt circuit for comparing the voltage source voltage (Vb) when measured respect to the ground return line (Vr) with a predetermined high voltage source reference voltage and for outputting a high voltage source interrupt signal in response to the voltage source voltage rising above the predetermined high voltage source voltage limit, the high voltage source signal being coupled to the over current delay and latch circuit to set the over current latch with no predetermined time delay.

* * * * *